US012339611B2

(12) United States Patent
Muramatsu et al.

(10) Patent No.: US 12,339,611 B2
(45) Date of Patent: Jun. 24, 2025

(54) IMAGE FORMING APPARATUS

(71) Applicant: CANON KABUSHIKI KAISHA, Tokyo (JP)

(72) Inventors: Motoyasu Muramatsu, Shizuoka (JP); Yuta Nakatomi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/191,721

(22) Filed: Mar. 28, 2023

(65) Prior Publication Data

US 2023/0324841 A1 Oct. 12, 2023

(30) Foreign Application Priority Data

Apr. 7, 2022 (JP) ................................ 2022-063812
Jan. 31, 2023 (JP) ................................ 2023-012441

(51) Int. Cl.
*G03G 15/00* (2006.01)
*G03G 15/09* (2006.01)

(52) U.S. Cl.
CPC ....... *G03G 15/607* (2013.01); *G03G 15/0907* (2013.01); *G03G 2215/00679* (2013.01); *G03G 2215/025* (2013.01)

(58) Field of Classification Search
CPC ............. G03G 15/607; G03G 15/0907; G03G 2215/00679; G03G 2215/025
See application file for complete search history.

(56) References Cited

U.S. PATENT DOCUMENTS

| | | | | |
|---|---|---|---|---|
| 7,548,723 B2 * | 6/2009 | Kang | B65H 31/02 | 400/624 |
| 2011/0227272 A1 * | 9/2011 | Kotera | B65H 29/125 | 271/9.13 |
| 2014/0248066 A1 * | 9/2014 | Akiyama | G03G 21/1633 | 399/107 |
| 2015/0104213 A1 * | 4/2015 | Tajiri | G03G 15/1615 | 399/121 |
| 2018/0055706 A1 * | 3/2018 | Madadin | G01G 21/22 | |
| 2019/0218049 A1 * | 7/2019 | Lo | B65H 29/125 | |

FOREIGN PATENT DOCUMENTS

JP 2005-315920 A 11/2005

* cited by examiner

*Primary Examiner* — David H Banh
(74) *Attorney, Agent, or Firm* — Canon U.S.A., Inc., IP Division

(57) ABSTRACT

An image forming apparatus incudes a first conveyance guide portion having a first roller, a first engagement portion, and a second engagement portion, and includes a second conveyance guide portion having a second roller, a first engaged portion, and a second engaged portion. The first and second conveyance guide portions form a conveyance path where the first and second rollers convey a sheet. The second conveyance guide portion moves so that engagement between the second engagement portion and the second engaged portion is released and relative positioning between the second and first conveyance guide portions is released. When the first engagement portion and the first engaged portion engage each other and the relative positioning between the second and first conveyance guide portions is released, the second conveyance guide portion pivots in an opening direction relative to the first conveyance guide portion so that the conveyance path is opened.

18 Claims, 32 Drawing Sheets

IMAGE FORMING APPARATUS

BACKGROUND

Field

The present disclosure relates to an image forming apparatus including a sheet conveyance guide portion.

Description of the Related Art

Among image forming apparatuses that form an image on a recording material such as a sheet using an image forming process such as an electrophotographic process, there is an image forming apparatus in which a conveyance guide portion openable and closable by a user is provided to replace a conveyance roller or remove a jammed recording material. As such a conveyance guide portion, there is a conveyance guide portion which includes a pivot shaft at one end of the conveyance guide portion on the upstream or downstream side in the conveyance direction of a recording material and for which a lock member is provided at the other end on the main body side or in the conveyance guide portion, as discussed in Japanese Patent Application Laid-Open No. 2005-315920.

SUMMARY

The present disclosure relates to a configuration for opening a conveyance path by opening a conveyance guide portion and is directed to an image forming apparatus excellent in usability regarding the opening of the conveyance guide portion. In an example, when a second conveyance guide portion is moved in a predetermined direction relative to a first conveyance guide portion, the positioning of the second conveyance guide portion relative to the first conveyance guide portion is released, and the second conveyance guide portion pivots relative to the first conveyance guide portion, whereby a conveyance path is opened.

According to an aspect of the present disclosure, an image forming apparatus configured to form an image on a sheet includes a first conveyance guide portion including a first roller, a first engagement portion, and a second engagement portion, and a second conveyance guide portion including a second roller, a first engaged portion configured to be engaged with the first engagement portion, and a second engaged portion configured to be engaged with the second engagement portion, wherein, in a state where the second conveyance guide portion is positioned at a predetermined position relative to the first conveyance guide portion, the first conveyance guide portion and the second conveyance guide portion form a conveyance path in which the sheet is conveyed, and the first roller and the second roller are in contact with each other so as to convey the sheet, wherein, in a state where the first engagement portion and the first engaged portion are engaged with each other, the second conveyance guide portion is configured to move along a predetermined direction relative to the first conveyance guide portion so that the engagement between the second engagement portion and the second engaged portion is released and the positioning of the second conveyance guide portion relative to the first conveyance guide portion is released, and wherein, in a state where the first engagement portion and the first engaged portion are engaged with each other and the positioning of the second conveyance guide portion relative to the first conveyance guide portion is released, the second conveyance guide portion is configured to pivot in an opening direction relative to the first conveyance guide portion so that the conveyance path is opened.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The following exemplary embodiments do not limit the disclosure according to the appended claims, and not all combinations of the features described in the exemplary embodiments are essential to the disclosure.

A first exemplary embodiment will be described.

<Image Forming Apparatus>

Figure 1:
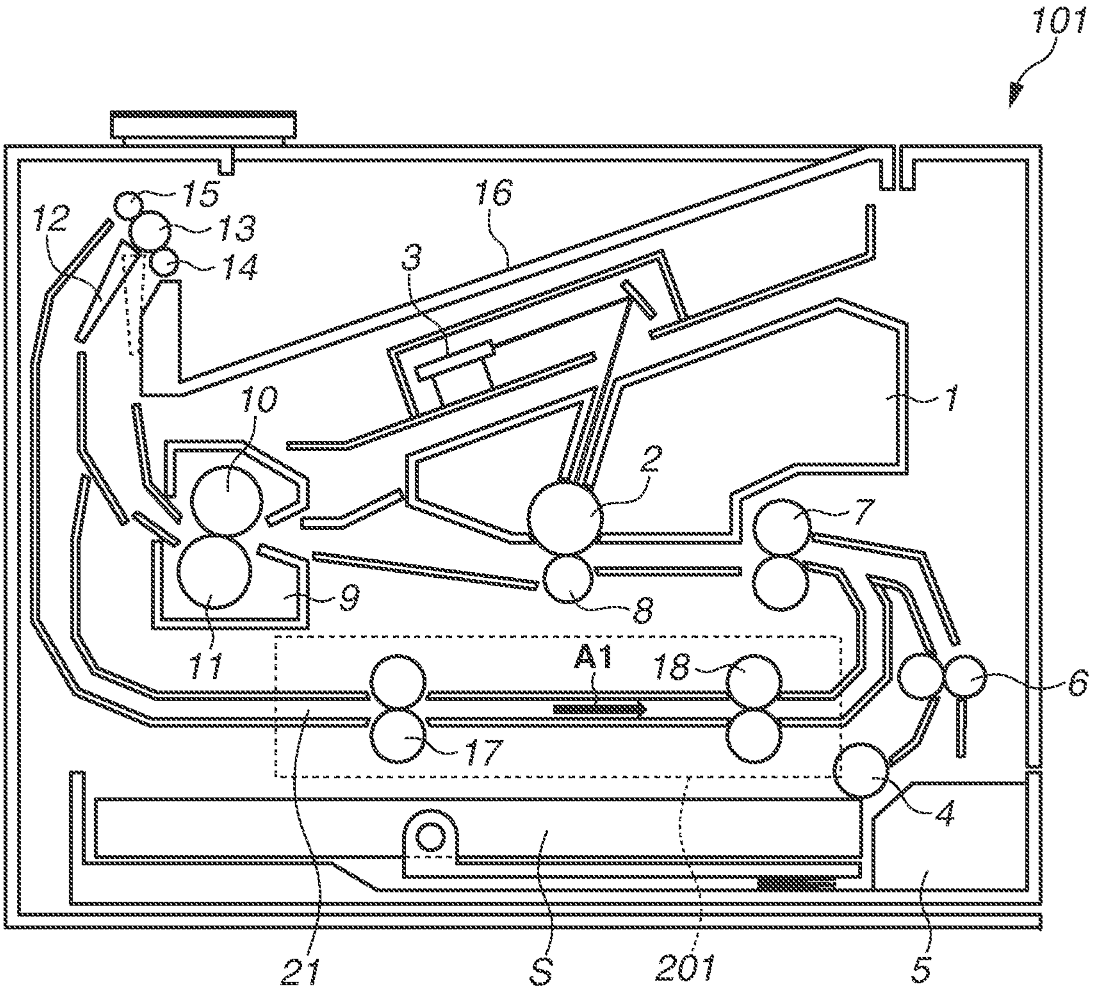
FIG. 1 is a cross-sectional view of an image forming apparatus according to a first exemplary embodiment.

FIG. 1 is a cross-sectional view illustrating an electrophotographic laser printer having a duplex image forming function as an example of an image forming apparatus according to the present exemplary embodiment. The dimensions, materials, shapes, and relative arrangement of components described in the present exemplary embodiment do not intend to limit the scope of the disclosure thereto unless otherwise specified. The image forming apparatus according to the present exemplary embodiment is not limited to the laser printer and can be a copier, a facsimile, or any other type of image forming apparatus.

An image forming apparatus 101 illustrated in FIG. 1 includes a sheet feeding unit, an image forming unit that forms an image on a sheet, a fixing unit, a sheet discharge reversing unit, and a duplex conveyance unit.

The image forming apparatus 101 includes a process cartridge 1 attachable to and detachable from a main body of the image forming apparatus 101. The process cartridge 1 includes a photosensitive drum 2 and process units (not illustrated) such as a development unit and a charge roller. A scanner unit 3 is placed above the process cartridge 1 in the vertical direction. The scanner unit 3 exposes the photosensitive drum 2 based on an image signal.

After the photosensitive drum 2 is charged to a potential having a predetermined negative polarity by the charge roller (not illustrated), the scanner unit 3 forms an electrostatic latent image on the photosensitive drum 2. The electrostatic latent image is reversely developed by the development unit in the process cartridge 1, toner having a negative polarity attaches to the electrostatic latent image, and a toner image is formed on the photosensitive drum 2.

The sheet feeding unit includes a sheet feeding roller 4 attached to the image forming apparatus 101, and a sheet feeding cassette 5 that is attachable to and detachable from the main body of the image forming apparatus 101 and stores sheets S. The sheets S stored in the sheet feeding cassette 5 are separated and fed one by one from the sheet feeding cassette 5 by the sheet feeding roller 4 rotated by the power of a sheet feeding drive unit (not illustrated). Each of the fed sheets S is conveyed to a registration roller pair 7 by a conveyance roller pair 6, is skew-corrected by the registration roller pair 7, and is conveyed to a transfer unit.

In the transfer unit, a bias having a positive polarity is applied to a transfer roller 8 by a bias application unit (not illustrated). Consequently, the toner image is transferred as an unfixed image to the sheet S conveyed to the transfer unit. The process cartridge 1 and the transfer roller 8 function as the image forming unit.

The sheet S to which the toner image is transferred is conveyed to a fixing device 9 as the fixing unit provided downstream of the transfer unit in a conveyance direction of the sheet S. The fixing device 9 is used to fix the toner image transferred to the sheet S and includes a heating roller 10 as a fixing member that is heated by a heater as a heating unit (not illustrated), and a pressure roller 11 as a pressure member that rotates in pressure contact with the heating roller 10. While the sheet S is nipped and conveyed by a fixing nip portion formed by the heating roller 10 and the pressure roller 11, heat and pressure are applied to the sheet S, whereby the toner image is fixed to the front side of the sheet S.

The sheet S to which the toner image is fixed is conveyed from the fixing device 9 to the sheet discharge reversing unit. The sheet discharge reversing unit includes a sheet discharge roller 13, a sheet discharge driven roller 14, a reverse driven roller 15, and a duplex flapper 12. In the case of one-sided image formation (simplex printing), the duplex flapper 12 is held at a position (indicated by a solid line) where the duplex flapper 12 guides the sheet S to a side where a sheet discharge nip portion formed by the sheet discharge roller 13 and the sheet discharge driven roller 14 is located, and the sheet S is discharged to a sheet discharge tray 16 by the sheet discharge roller 13 and the sheet discharge driven roller 14.

In the case of two-sided image formation (duplex printing), the duplex flapper 12 is held at a position (indicated by a dashed line) where the duplex flapper 12 guides the sheet S to a side where a reversing nip portion formed by the sheet discharge roller 13 and the reverse driven roller 15 is located, and the sheet S is conveyed to the reversing nip portion side by the fixing device 9. At timing when a trailing edge of the sheet S reaches a predetermined position, the sheet discharge roller 13 is rotated reversely by a rotational direction switching unit (not illustrated).

Figure 2:
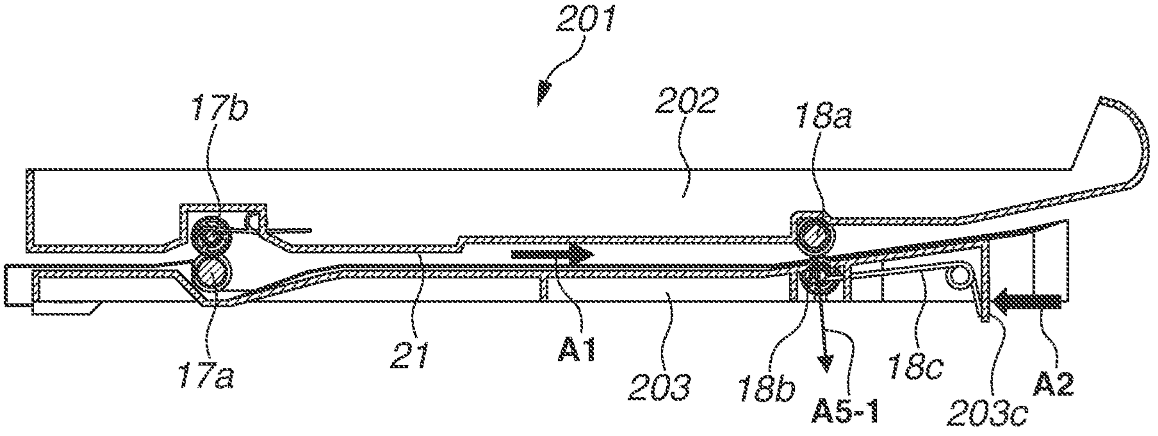
FIG. 2 is a cross-sectional view of a duplex conveyance unit according to the first exemplary embodiment.

Consequently, the sheet S passes through a duplex conveyance roller pair 17 (first and second duplex conveyance rollers 17*b* and 17*a* in FIG. 2) and a sheet re-feeding roller pair 18 (first and second sheet re-feeding rollers 18*a* and 18*b* in FIG. 2) with the trailing edge at the head and is conveyed again to the registration roller pair 7 in a state where the front and back sides are reversed. Then, similarly to the simplex printing, the skew of the sheet S is corrected by the registration roller pair 7, an image is transferred to the sheet S by the transfer roller 8, and the image is fixed to the sheet S by the fixing device 9. The sheet S is then discharged to the sheet discharge tray 16 by the sheet discharge roller 13 and the sheet discharge driven roller 14, whereby the duplex printing is completed.

<Duplex Conveyance Unit>

Next, a configuration of a duplex conveyance unit 201 illustrated in FIG. 1 will be described with reference to FIGS. 2 to 15. FIGS. 2 and 3 and FIGS. 7 to 9 are side views of the duplex conveyance unit 201. FIGS. 4A to 6B and FIGS. 10A to 13 are enlarged views including at least one of a first engagement portion, a first engaged portion, a second engagement portion, and a second engaged portion.

Figure 3:
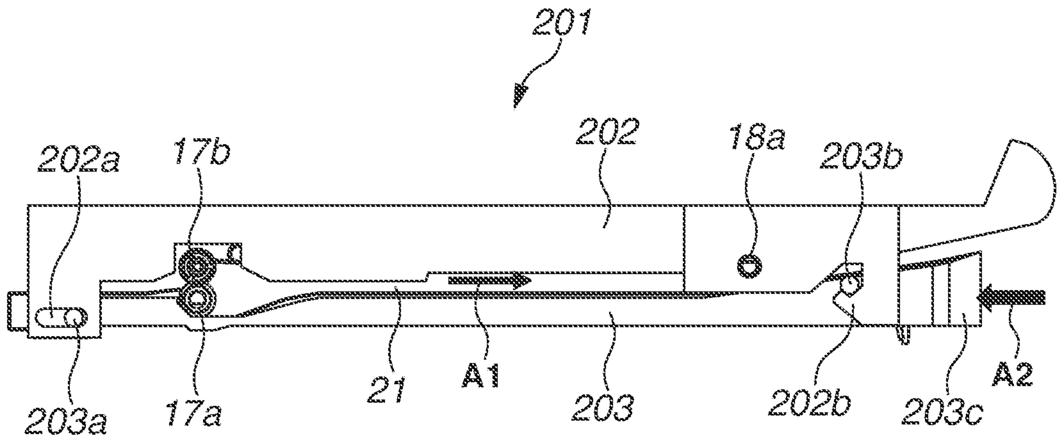
FIG. 3 is a side view of the duplex conveyance unit according to the first exemplary embodiment.

As illustrated in FIG. 3, the duplex conveyance unit 201 includes a first conveyance guide portion 202 and a second conveyance guide portion 203 as guide portions. The first conveyance guide portion 202 and the second conveyance guide portion 203 form a conveyance path 21 in which the sheet S is conveyed. The conveyance path 21 is a conveyance path in which the sheet S is conveyed in order to form an image on the other side of the sheet S after an image is formed on the front side.

The first conveyance guide portion 202 guides the upper side of the sheet S being conveyed. The first conveyance guide portion 202 is located above the second conveyance guide portion 203 in the vertical direction. The second conveyance guide portion 203 guides the lower side of the sheet S being conveyed. The second conveyance guide portion 203 is located below the first conveyance guide portion 202 in the vertical direction.

The first conveyance guide portion 202 includes the first duplex conveyance roller 17*b* as a first roller and the first sheet re-feeding roller 18*a* as a third roller. The first conveyance guide portion 202 also includes a long hole 202*a* as a first engagement portion and a groove 202*b* as a second engagement portion with which protruding portions (described below) are engaged. The long hole 202*a* and the groove 202*b* are provided on one end side of the first conveyance guide portion 202 in an axial direction of the first duplex conveyance roller 17*b*. The long hole 202*a* and the groove 202*b* are also provided on the other end side of the first conveyance guide portion 202 in the axial direction of the first duplex conveyance roller 17*b*.

FIGS. 2 and 3 are cross-sectional views of the first conveyance guide portion 202 when viewed from a direction intersecting the conveyance direction of the sheet S, and thus illustrate only one long hole 202*a* and one groove 202*b* on one end side of the first conveyance guide portion 202. However, one long hole 202*a* and one groove 202*b* are also provided on the other end side of the first conveyance guide portion 202.

Figure 4A:
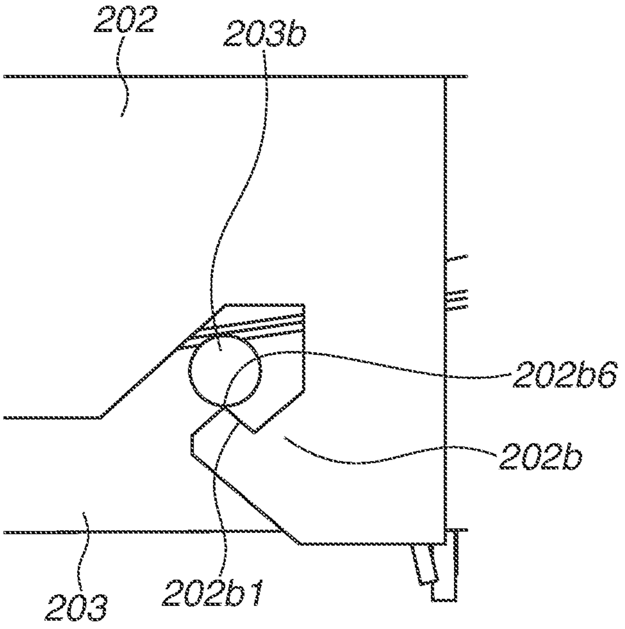
FIGS. 4A and 4B are side views of the duplex conveyance unit according to the first exemplary embodiment.
Figure 4B:
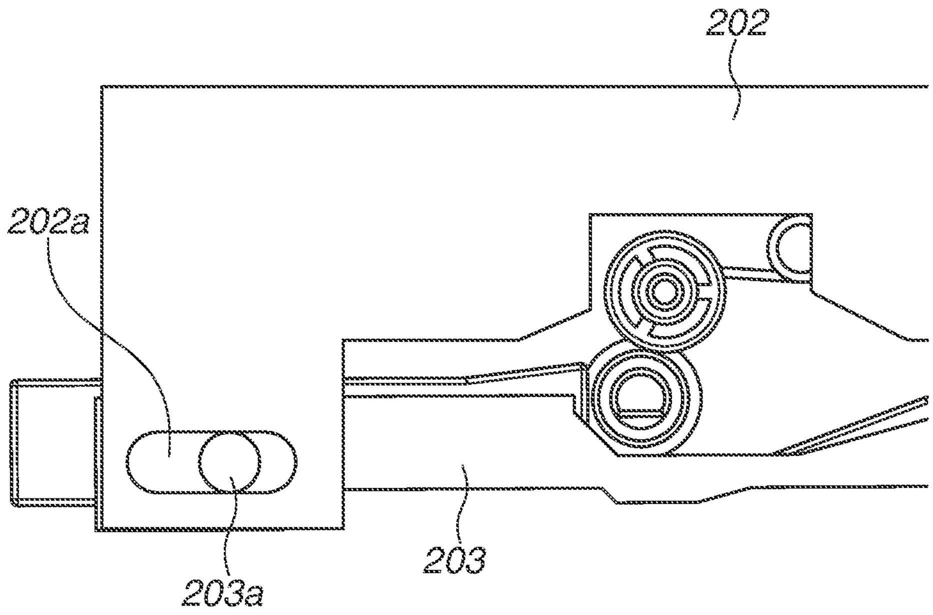
Figure 5A:
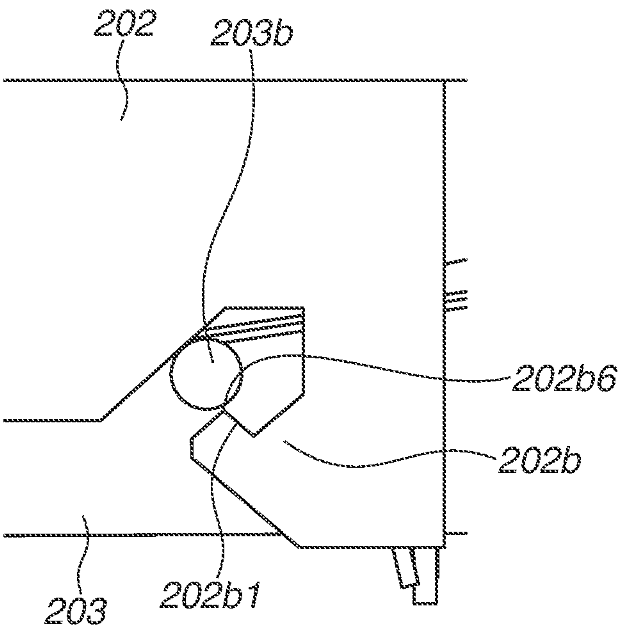
FIGS. 5A and 5B are side views of the duplex conveyance unit according to the first exemplary embodiment.
Figure 5B:
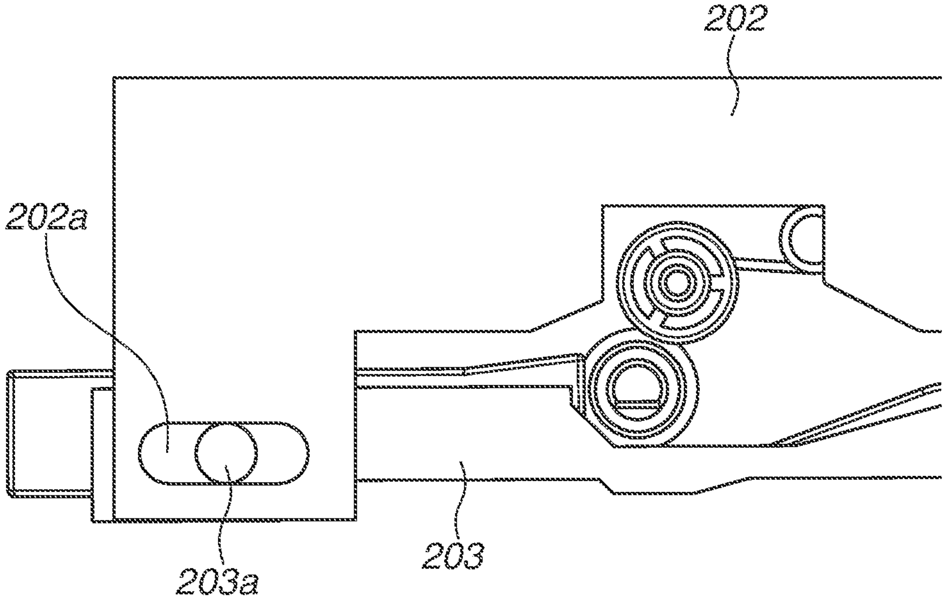

The second conveyance guide portion 203 includes the second duplex conveyance roller 17*a* as a second roller capable of coming into contact with and separating from the first duplex conveyance roller 17*b*. The second conveyance guide portion 203 also includes the second sheet re-feeding roller 18*b* as a fourth roller. As illustrated in FIGS. 4A and 4B, the second conveyance guide portion 203 also includes an engagement protrusion 203*a* as a first engaged portion that is engaged with the first engagement portion, and a positioning protrusion 203*b* as a second engaged portion that is engaged with the second engagement portion.

The engagement protrusion 203*a* and the positioning protrusion 203*b* are protruding portions protruding from the second conveyance guide portion 203. The engagement protrusion 203*a* and the positioning protrusion 203*b* are provided on one end side of the second conveyance guide portion 203 in the axial direction of the first duplex conveyance roller 17*b* of the first conveyance guide portion 202. The engagement protrusion 203*a* and the positioning protrusion 203*b* are also provided on the other end side of the second conveyance guide portion 203 in the axial direction of the first duplex conveyance roller 17*b* of the first conveyance guide portion 202.

In a state where the second conveyance guide portion 203 is positioned at a predetermined position relative to the first conveyance guide portion 202, the first conveyance guide portion 202 and the second conveyance guide portion 203 form the conveyance path 21, and the first duplex conveyance roller 17*b* and the second duplex conveyance roller 17*a* are in contact with each other so as to convey the sheet S. At this time, the first sheet re-feeding roller 18*a* and the second sheet re-feeding roller 18*b* are also in contact with each other so as to convey the sheet S. As illustrated in FIG. 2, the second sheet re-feeding roller 18*b* is biased toward the first sheet re-feeding roller 18*a* by a sheet re-feeding roller spring 18*c* as a roller biasing portion.

A more detailed description will be given of the state where the first conveyance guide portion 202 and the second conveyance guide portion 203 are positioned at the predetermined position as illustrated in FIG. 3. While the first conveyance guide portion 202 and the second conveyance guide portion 203 are positioned at the predetermined position, the engagement protrusion 203*a* is engaged with the long hole 202*a* and is located on a right end side (in FIG. 3) of the long hole 202*a* extending in the direction of the conveyance path 21 of the sheet S.

While the second conveyance guide portion 203 is positioned at the predetermined position relative to the first conveyance guide portion 202, the positioning protrusion 203*b* is engaged with the groove 202*b*. The positioning protrusion 203*b* is positioned toward the inner side of the groove 202*b*. The positioning protrusion 203*b* is positioned in the groove 202*b* by a force due to the self-weight of the second conveyance guide portion 203 or the reaction force of the second sheet re-feeding roller 18*b* biased by the sheet re-feeding roller spring 18*c*. In other words, the groove 202*b* receives, via the positioning protrusion 203*b*, the self-weight of the second conveyance guide portion 203 or the reaction force of the second sheet re-feeding roller 18*b* biased by the sheet re-feeding roller spring 18*c*.

Figure 7:
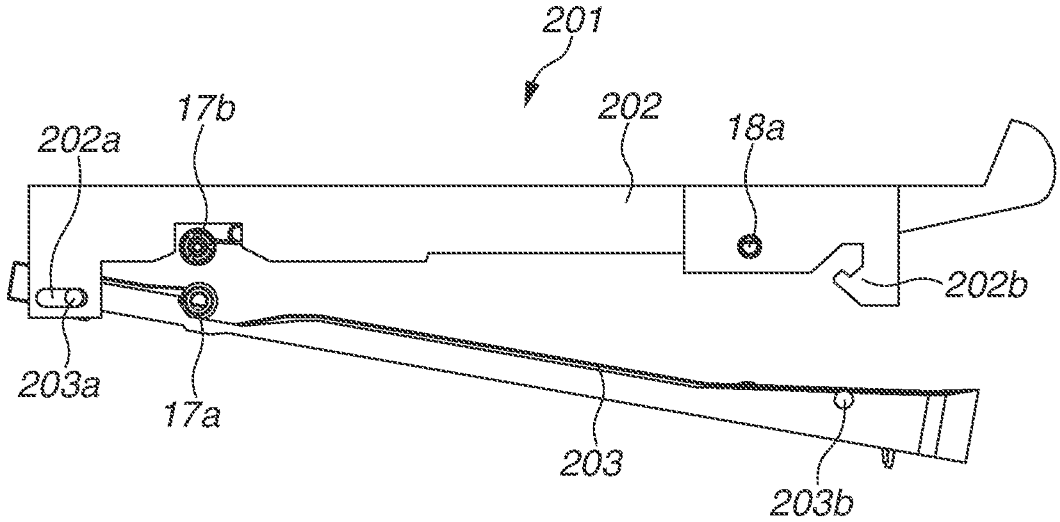
FIG. 7 is a side view of the duplex conveyance unit according to the first exemplary embodiment.

Next, the opening of the duplex conveyance unit 201 will be described. As illustrated in FIG. 7, the duplex conveyance unit 201 can open the conveyance path 21. More specifically, the engagement between the positioning protrusion 203*b* and the groove 202*b* is released, and the second conveyance guide portion 203 pivots about the engagement protrusion 203*a* relative to the first conveyance guide portion 202, whereby the conveyance path 21 is opened. A direction in which the second conveyance guide portion 203 pivots relative to the first conveyance guide portion 202 at this time is referred to as an "opening direction". A direction opposite to the opening direction is referred to as a "closing direction".

At this time, the second conveyance guide portion 203 moves in a direction away from the conveyance path 21, whereby the first duplex conveyance roller 17*b* and the second duplex conveyance roller 17*a* separate from each other.

If the sheet S is jammed in the duplex conveyance unit 201, a user or a serviceman can remove the jammed sheet S by opening the conveyance path 21. The user or the serviceman can also replace a roller attached to the first conveyance guide portion 202 or the second conveyance guide portion 203.

In the state where the positioning protrusion 203*b* is positioned in the groove 202*b*, the second conveyance guide portion 203 is unable to pivot. On the other hand, in the state where the engagement protrusion 203*a* and the long hole 202*a* are engaged with each other and the positioning between the first conveyance guide portion 202 and the second conveyance guide portion 203 is released, the second conveyance guide portion 203 can pivot relative to the first conveyance guide portion 202. The opening direction is the direction in which the second conveyance guide portion 203 pivots under its self-weight relative to the first conveyance guide portion 202.

The positioning of the positioning protrusion 203*b* can be released by detaching the sheet feeding cassette 5 and moving (translating) the second conveyance guide portion 203 along a predetermined direction relative to the first conveyance guide portion 202. In the present exemplary embodiment, the predetermined direction is a direction opposite to the conveyance direction (indicated by an arrow A1) of the sheet S. "The conveyance direction of the sheet S" as used herein refers to the conveyance direction of the sheet S conveyed by the first duplex conveyance roller 17*b* and the second duplex conveyance roller 17*a*. When the second conveyance guide portion 203 is moved along the opposite direction, the position of the engagement protrusion 203*a* also shifts to a left side (a direction indicated by an arrow A2 in FIG. 3) of the long hole 202*a*. In other words, in the state where the engagement protrusion 203*a* and the long hole 202*a* are engaged with each other, the second conveyance guide portion 203 is movable in the predetermined direction (the opposite direction) relative to the first conveyance guide portion 202. In other words, in the state where the engagement protrusion 203*a* and the long hole 202*a* are engaged with each other, the second conveyance guide portion 203 can be moved (translated) to be displaced in the conveyance direction of the sheet S and the opposite direction relative to the first conveyance guide portion 202. This results in switching between the state where the groove 202*b* and the positioning protrusion 203*b* are engaged with each other and the state where the engagement between the groove 202*b* and the positioning protrusion 203*b* is released.

In the conveyance direction of the sheet S, the engagement protrusion 203*a* and the long hole 202*a* are located upstream of the groove 202*b* and the positioning protrusion 203*b*. To move the second conveyance guide portion 203, a handle portion 203*c*, which is a pressed portion of the second conveyance guide portion 203 in FIG. 2, can be pressed toward the direction indicated by the arrow A2. When the second conveyance guide portion 203 is moved along the predetermined direction (the opposite direction), the engagement between the groove 202*b* and the positioning protrusion 203*b* is released, and the positioning of the second conveyance guide portion 203 relative to the first conveyance guide portion 202 is released. In other words, pressing the pressed portion causes the second conveyance guide portion 203 to move in the direction in which the engagement between the groove 202*b* and the positioning protrusion 203*b* is released.

When the engagement between the groove 202*b* and the positioning protrusion 203*b* is released and the second conveyance guide portion 203 pivots relative to the first conveyance guide portion 202, the conveyance path 21 is opened. In other words, the positioning of the second conveyance guide portion 203 relative to the first conveyance guide portion 202 is released, the engagement between the groove 202*b* and the positioning protrusion 203*b* is released, and the second conveyance guide portion pivots relative to the first conveyance guide portion, whereby the conveyance path 21 is opened.

A more detailed description will be given of the engagement between the groove 202*b* and the positioning protrusion 203*b* in opening the conveyance path 21. When the user presses the handle portion 203*c* toward the direction indicated by the arrow A2, then as illustrated in FIG. 4A, the positioning protrusion 203*b* climbs up a first guide portion 202*b*1 of the groove 202*b*. At this time, as illustrated in FIG. 4B, the engagement protrusion 203*a* moves in a left direction in the long hole 202*a*. When the user further pushes the handle portion 203*c* in the direction indicated by the arrow A2, then as illustrated in FIGS. 5A, 5B, 6A, and 6B, in the state where the engagement protrusion 203*a* and the long hole 202*a* are engaged with each other, the positioning protrusion 203*b* climbs over a first guide portion end 202*b*6. The positioning protrusion 203*b* then moves in a direction indicated by a dashed arrow B in FIG. 6A, and the second conveyance guide portion 203 opens.

Next, the operation of closing the conveyance path 21 will be described. After the user lifts up the second conveyance guide portion 203 in the opened state illustrated in FIG. 7, the groove 202*b* and the positioning protrusion 203*b* are engaged with each other, and the second conveyance guide portion 203 is positioned relative to the first conveyance guide portion 202, whereby the conveyance path 21 is closed. At this time, as illustrated in FIGS. 8 and 9, pivot trajectories L1 and L2 of the positioning protrusion 203*b* differ depending on the position of the engagement protrusion 203*a* relative to the long hole 202*a*.

Figure 8:
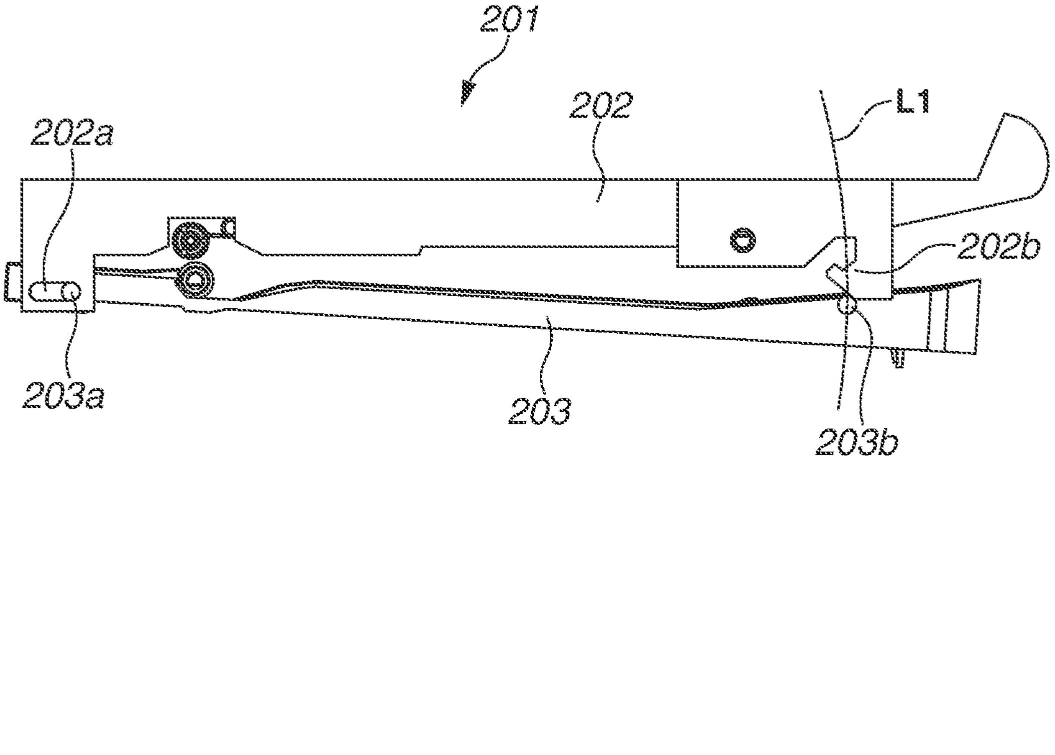
FIG. 8 is a side view of the duplex conveyance unit according to the first exemplary embodiment.
Figure 9:
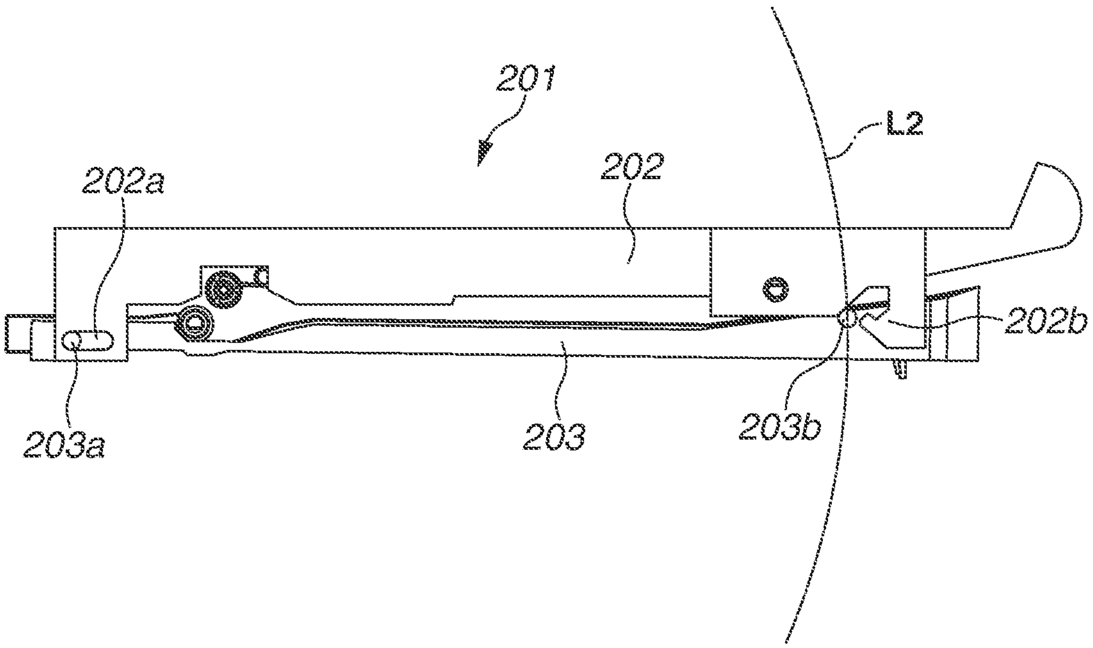
FIG. 9 is a side view of the duplex conveyance unit according to the first exemplary embodiment.
Figure 10A:
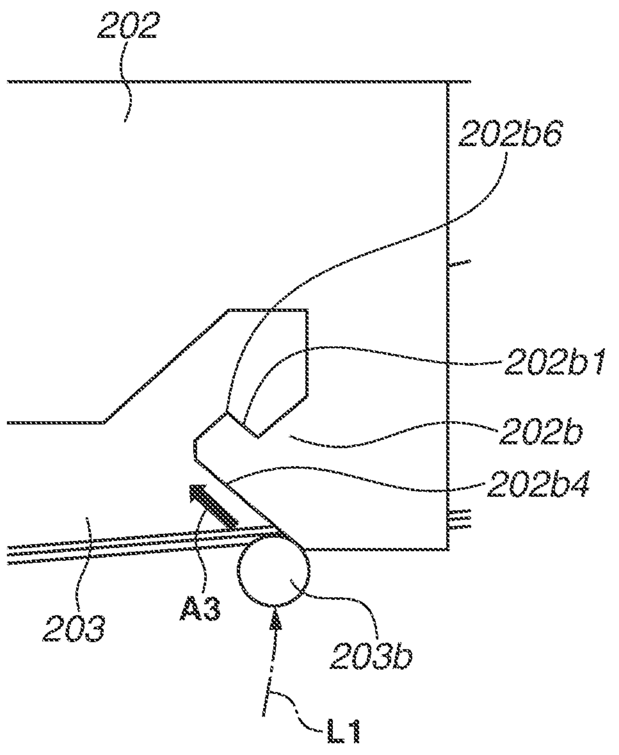
FIGS. 10A and 10B are side views of the duplex conveyance unit according to the first exemplary embodiment.

As illustrated in FIG. 8, if the second conveyance guide portion 203 is lifted up in a state where the second conveyance guide portion 203 is pulled out in the conveyance direction of the sheet S, the engagement protrusion 203*a* is located in one end portion of the long hole 202*a*, and the positioning protrusion 203*b* comes into contact with a fourth guide portion 202*b*4 illustrated in FIG. 10A. As illustrated in FIG. 9, if the second conveyance guide portion 203 is lifted up in a state where the second conveyance guide portion 203 is pushed in the opposite direction, the engagement protrusion 203*a* is located in the other end portion of the long hole 202*a*, and the positioning protrusion 203*b* comes into contact with a third guide portion 202*b*3 illustrated in FIG. 11A.

Figure 10B:
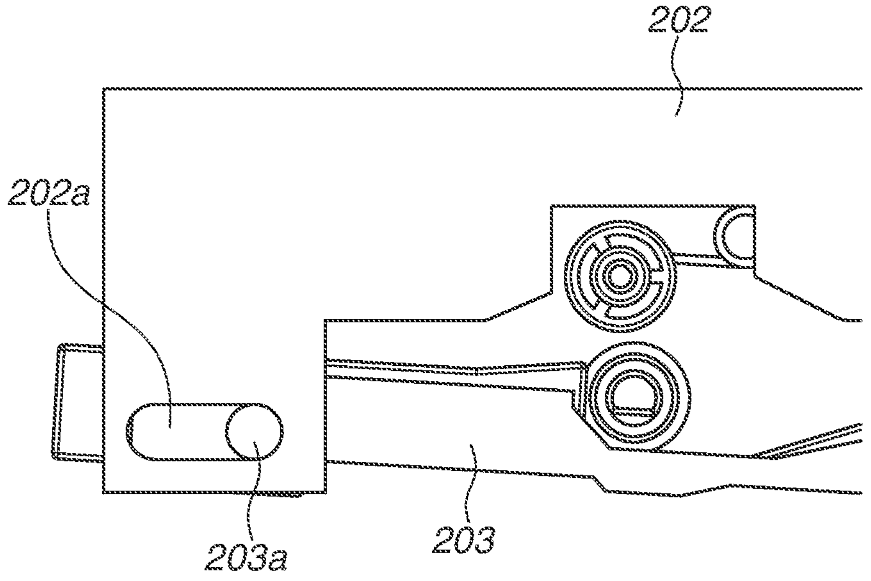
Figure 11A:
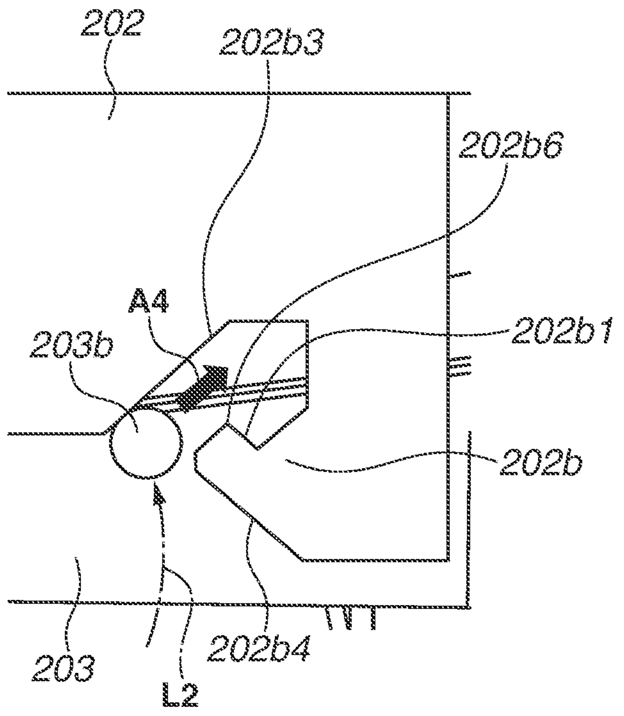
FIGS. 11A and 11B are side views of the duplex conveyance unit according to the first exemplary embodiment.

As illustrated in FIGS. 10A and 10B, if the second conveyance guide portion 203 is lifted up in the state where the engagement protrusion 203*a* is located in one end portion of the long hole 202*a* and the positioning protrusion 203*b* is in contact with the fourth guide portion 202*b*4, the positioning protrusion 203*b* is lifted up along the fourth guide portion 202*b*4 in a direction indicated by an arrow A3 and comes into contact with the third guide portion 202*b*3 illustrated in FIG. 11A. At this time, the second conveyance guide portion 203 moves in a direction from the positioning position to the release position.

Figure 11B:
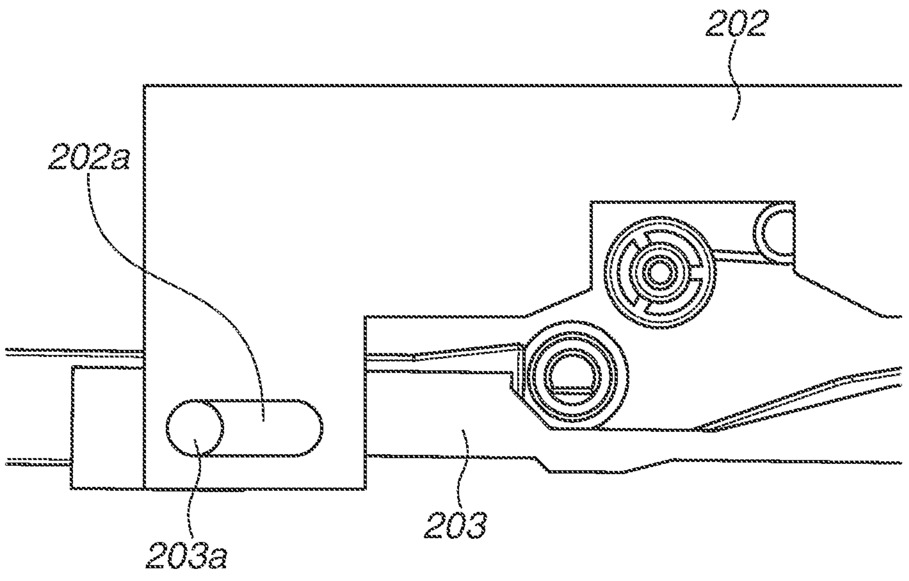
Figure 12A:
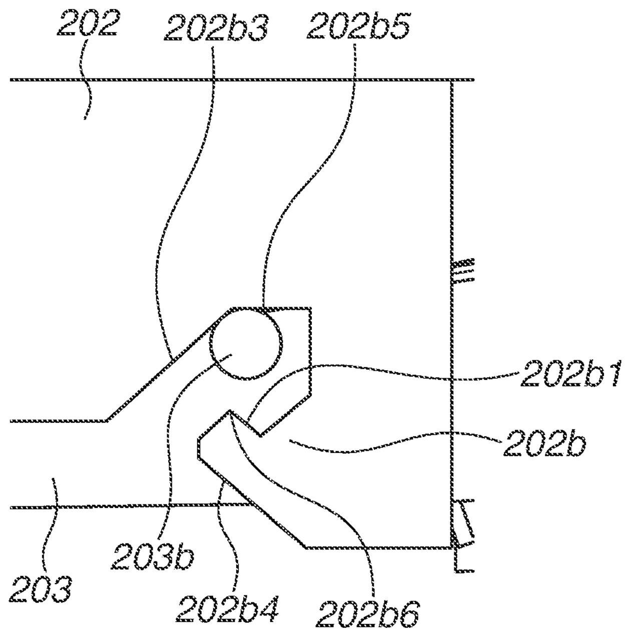
FIGS. 12A and 12B are side views of the duplex conveyance unit according to the first exemplary embodiment.
Figure 12B:
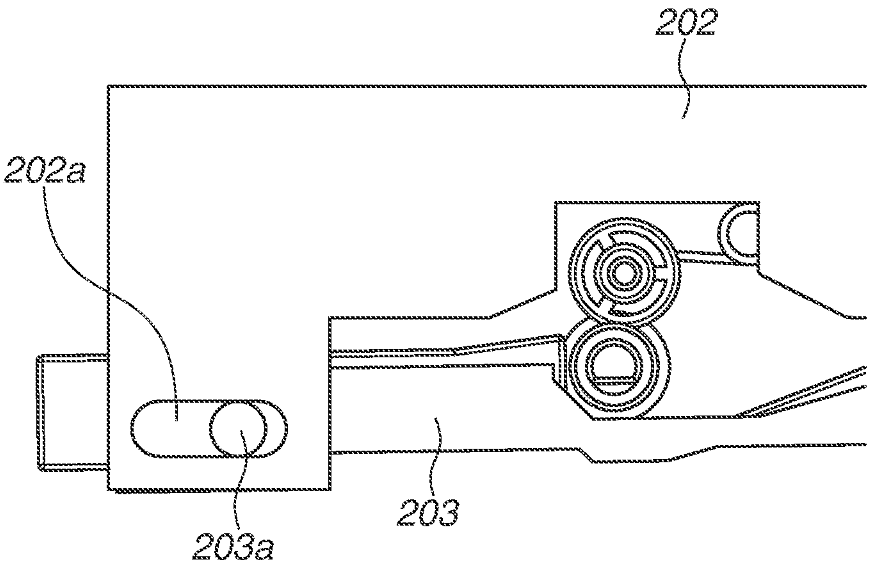

As illustrated in FIGS. 11A and 11B, in the state where the engagement protrusion 203*a* is engaged with the long hole 202*a*, the positioning protrusion 203*b* in contact with the third guide portion 202*b*3 is lifted up along the third guide portion 202*b*3 in a direction indicated by an arrow A4. At this time, the second conveyance guide portion 203 moves in a direction from the release position to the positioning position. If the second conveyance guide portion 203 continues to be lifted up, then as illustrated in FIGS. 12A and 12B, in the state where the engagement protrusion 203*a* is engaged with the long hole 202*a*, the positioning protrusion 203*b* reaches a contact surface 202*b*5 of the groove 202*b*. At this time, as illustrated in FIG. 13, an axial center 203*b*1 of the positioning protrusion 203*b* is configured to be downstream of the first guide portion end 202*b*6 of the groove 202*b* in the conveyance direction by a distance L3.

Figure 13:
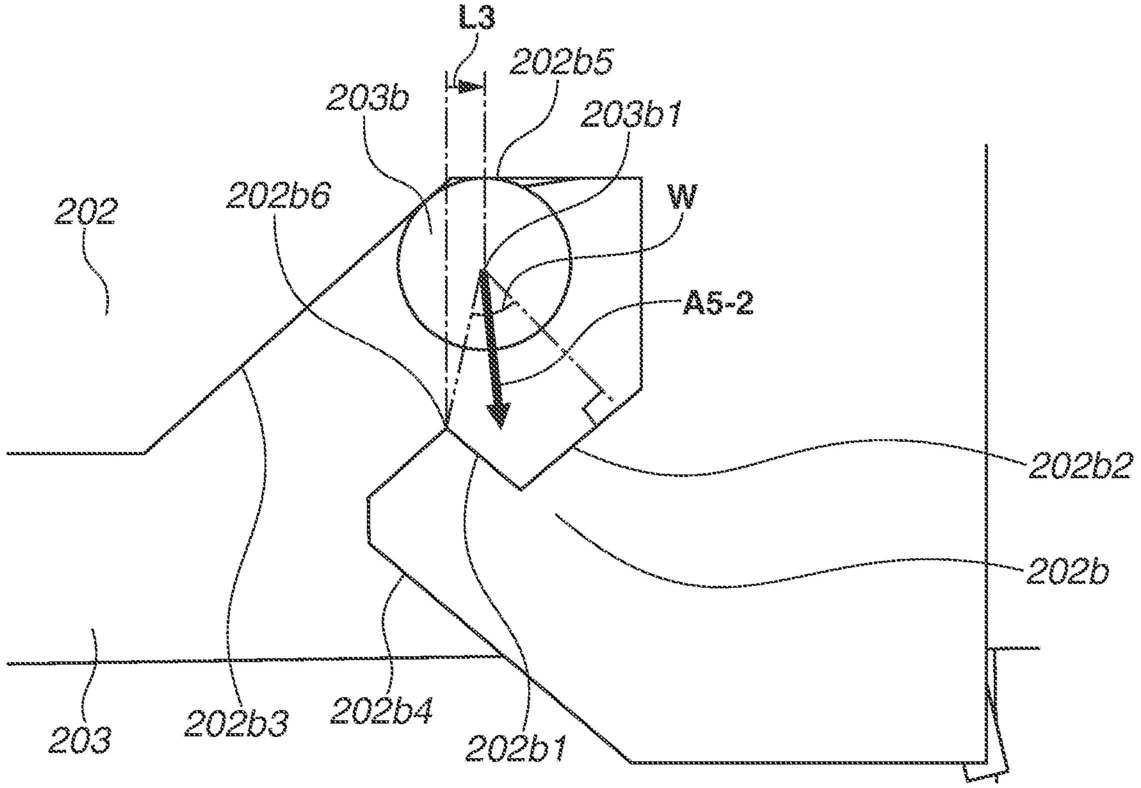
FIG. 13 is a side view of the duplex conveyance unit according to the first exemplary embodiment.
Figure 14:
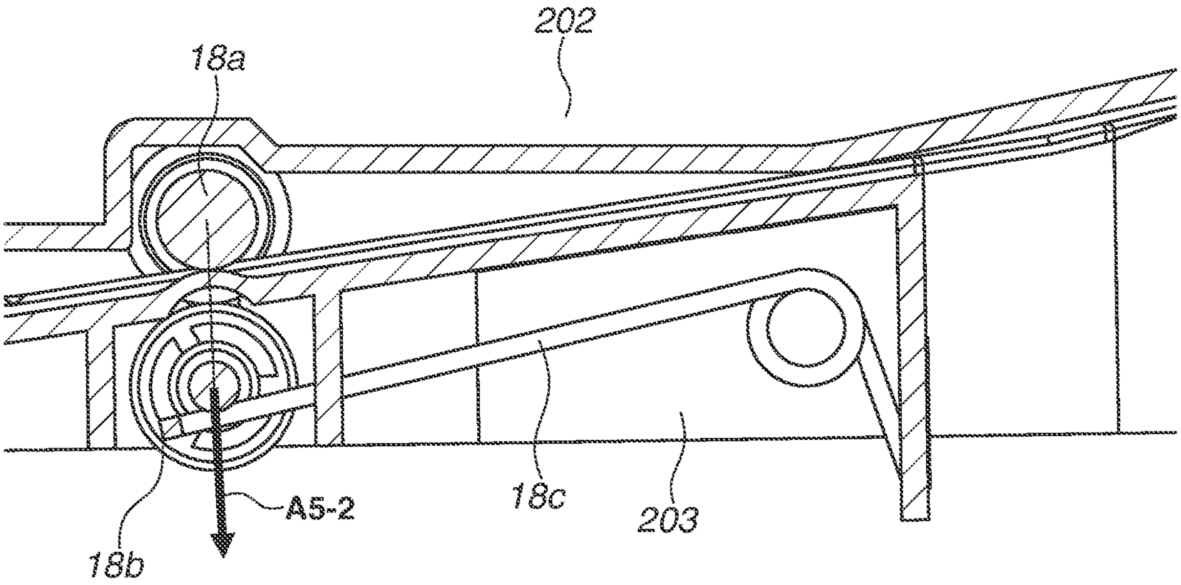
FIG. 14 is a cross-sectional view of the duplex conveyance unit according to the first exemplary embodiment.

Further, when the positioning protrusion 203*b* comes into contact with the contact surface 202*b*5 of the groove 202*b* as illustrated in FIG. 13, an arrow A5-2 indicating a direction of the reaction force of the sheet re-feeding roller spring 18*c* acting on the axial center 203*b*1 of the positioning protrusion 203*b* as illustrated in FIG. 14 overlaps a range W. Thus, if the user relaxes the force on the positioning protrusion 203*b* in a state where the user lifts up the positioning protrusion 203*b* to the contact surface 202*b*5, the positioning protrusion 203*b* is positioned in the groove 202*b*, and the duplex conveyance unit 201 enters a closed state.

In the present exemplary embodiment, the range W is from a line connecting the axial center 203*b*1 of the positioning protrusion 203*b* and the first guide portion end 202*b*6 to a perpendicular to a second guide portion 202*b*2 of the groove 202*b* passing through the axial center 203*b*1 of the positioning protrusion 203*b*.

In the state where the second conveyance guide portion 203 is positioned relative to the first conveyance guide portion 202, two portions (two contact portions) of the positioning protrusion 203*b* are in contact with a part of the first conveyance guide portion 202 (a part forming the groove 202*b*). The reaction force indicated by the arrow A5-2 acts so that the two contact portions of the positioning protrusion 203*b* are pressed against the part of the first conveyance guide portion 202 (the part forming the groove 202*b*).

Figure 15:
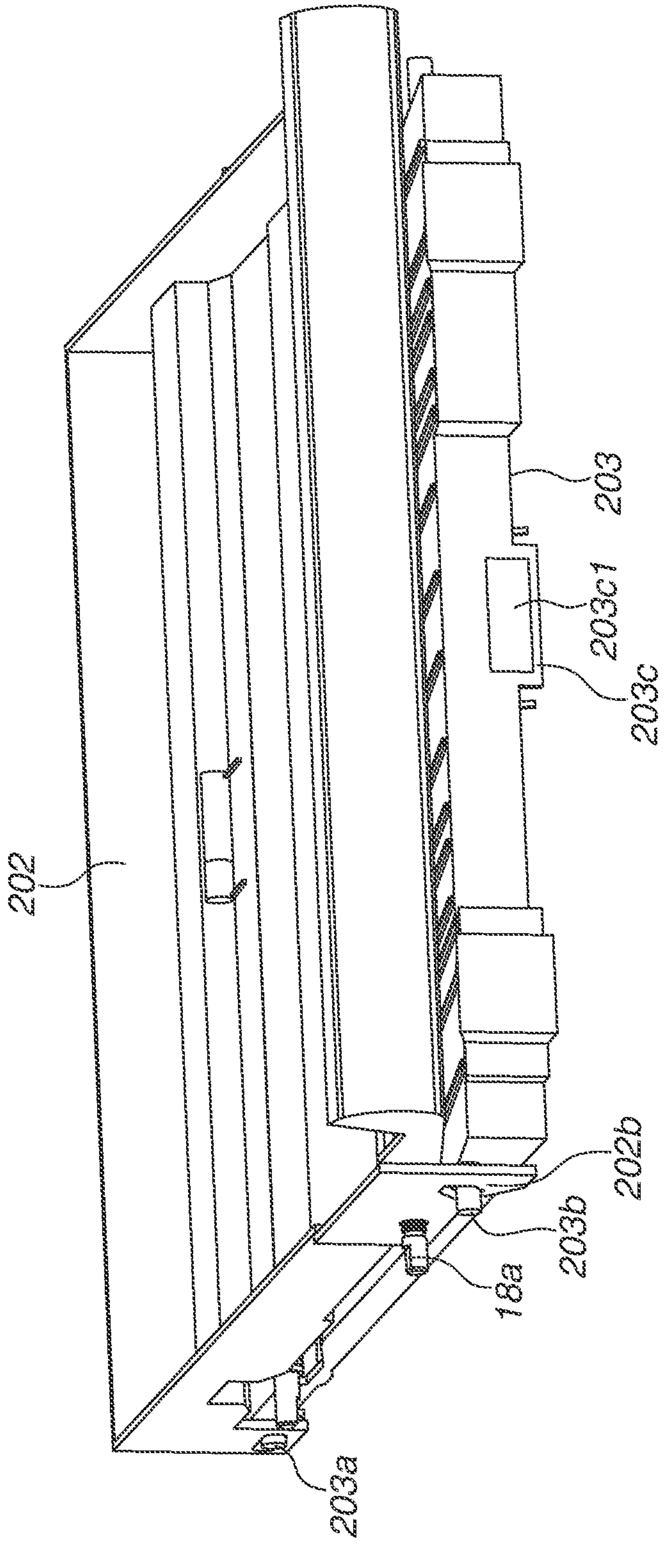
FIG. 15 is an external perspective view of the duplex conveyance unit according to the first exemplary embodiment.

As illustrated in FIG. 15, a label 203*c*1 with an illustration or characters urging the user to perform an operation is attached to the handle portion 203*c* of the second conveyance guide portion 203, thereby making it possible to improve visibility and operability.

As described above, in the state where the engagement protrusion 203*a* and the long hole 202*a* are engaged with each other, the second conveyance guide portion 203 is movable to the positioning position and the release position along the predetermined direction relative to the first conveyance guide portion 202.

As illustrated in FIG. 3, while the second conveyance guide portion 203 is at the positioning position relative to the first conveyance guide portion 202, the second conveyance guide portion 203 is positioned relative to the first conveyance guide portion 202. In this state, the groove 202*b* and the positioning protrusion 203*b* are engaged with each other, and the second conveyance guide portion 203 is restricted from pivoting in the opening direction relative to the first conveyance guide portion 202. In other words, with respect to the opening direction about the engagement protrusion 203*a*, a part of the first conveyance guide portion 202 is downstream of a part of the second conveyance guide portion 203.

While the second conveyance guide portion 203 is at the positioning position relative to the first conveyance guide portion 202, the first duplex conveyance roller 17*b* and the second duplex conveyance roller 17*a* are in contact with each other so as to convey the sheet S. Further, the first conveyance guide portion 202 and the second conveyance guide portion 203 form the conveyance path 21.

Figure 6A:
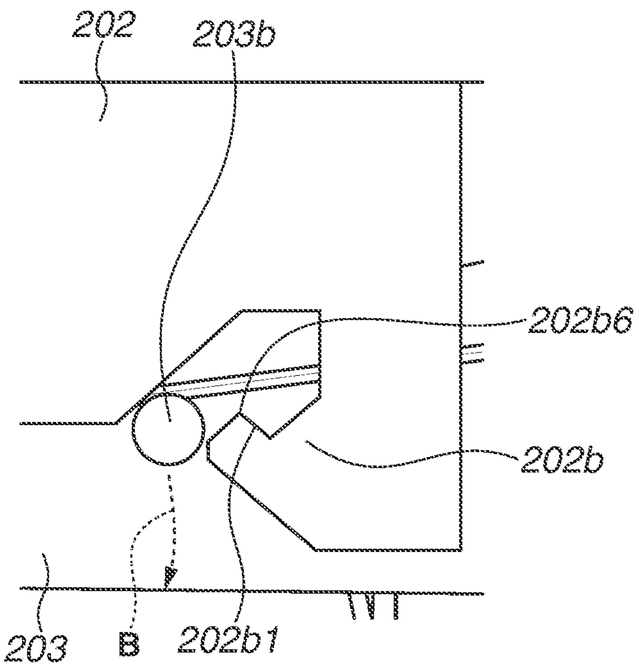
FIGS. 6A and 6B are side views of the duplex conveyance unit according to the first exemplary embodiment.
Figure 6B:
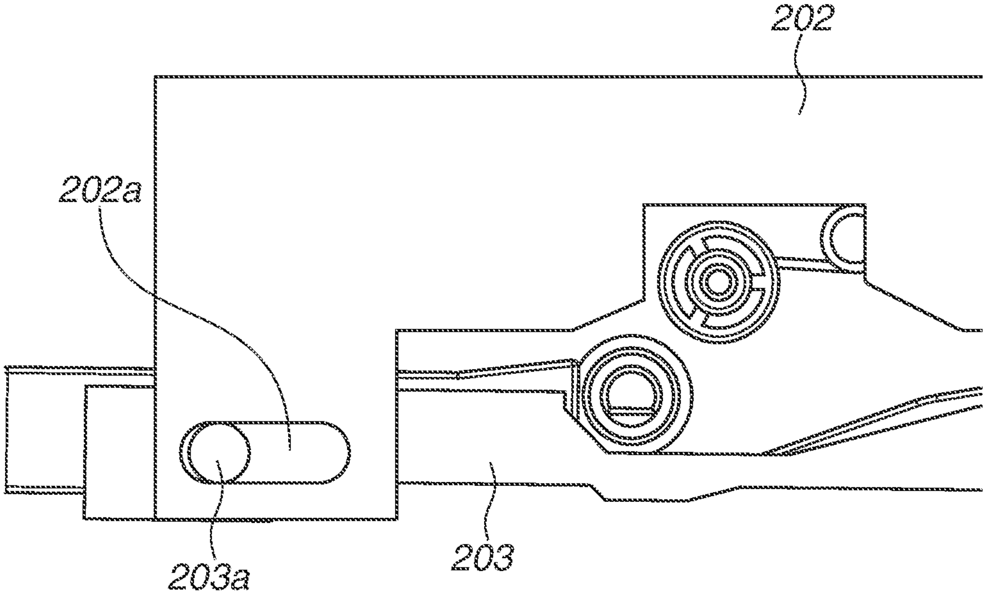

On the other hand, as illustrated in FIGS. 6A and 6B, while the second conveyance guide portion 203 is at the release position relative to the first conveyance guide portion 202, the engagement protrusion 203*a* and the long hole 202*a* are engaged with each other, and the engagement between the groove 202*b* and the positioning protrusion 203*b* is released. In this state, the second conveyance guide portion 203 is allowed to pivot in the opening direction relative to the first conveyance guide portion 202. In the state where the engagement protrusion 203*a* and the long hole 202*a* are engaged with each other, the second conveyance guide portion 203 pivots from the release position in the opening direction relative to the first conveyance guide portion 202, whereby the conveyance path 21 is opened.

In the state where the engagement protrusion 203*a* and the long hole 202*a* are engaged with each other, when the second conveyance guide portion 203 is moved along the predetermined direction relative to the first conveyance guide portion 202, the engagement between the groove 202*b* and the positioning protrusion 203*b* is released. Then, the positioning of the second conveyance guide portion 203 relative to the first conveyance guide portion 202 is also released. The predetermined direction can be referred to as "a direction from the positioning position to the release position". When the second conveyance guide portion 203 is moved from the positioning position to the release position, the second duplex conveyance roller 17*a* moves relative to the first duplex conveyance roller 17*b*. More specifically, the second duplex conveyance roller 17*a* moves in a direction intersecting the rotational axis direction of the first duplex conveyance roller 17*b*. While the second conveyance guide portion 203 is at the release position, the second duplex conveyance roller 17*a* is away from the first duplex conveyance roller 17*b*.

In the present exemplary embodiment, the second conveyance guide portion 203 is configured to move relative to the first conveyance guide portion 202 and the main body. Alternatively, the first conveyance guide portion 202 can be configured to move relative to the second conveyance guide portion 203.

As described above, moving the second conveyance guide portion 203 itself relative to the first conveyance guide portion 202 makes it possible to release the positioning of the second conveyance guide portion 203 relative to the first conveyance guide portion 202 and pivot the second conveyance guide portion 203 relative to the first conveyance guide portion 202. Moving the second conveyance guide portion 203 itself relative to the first conveyance guide portion 202 to release the positioning eliminates the need to unlock another member, which provides excellent usability. Moreover, since a lock member does not need to be provided separately, it is also possible to achieve cost reduction and miniaturization. Furthermore, a decrease in the number of components reduces the influence of tolerance and also increases the accuracy of the positioning of the second conveyance guide portion 203 relative to the first conveyance guide portion 202.

A second exemplary embodiment will be described with reference to FIGS. 16 to 24D. FIGS. 18A to 20C and FIGS. 23A to 24D are enlarged views including at least one of a first engagement portion, a first engaged portion, a second engagement portion, and a second engaged portion.

Figure 17:
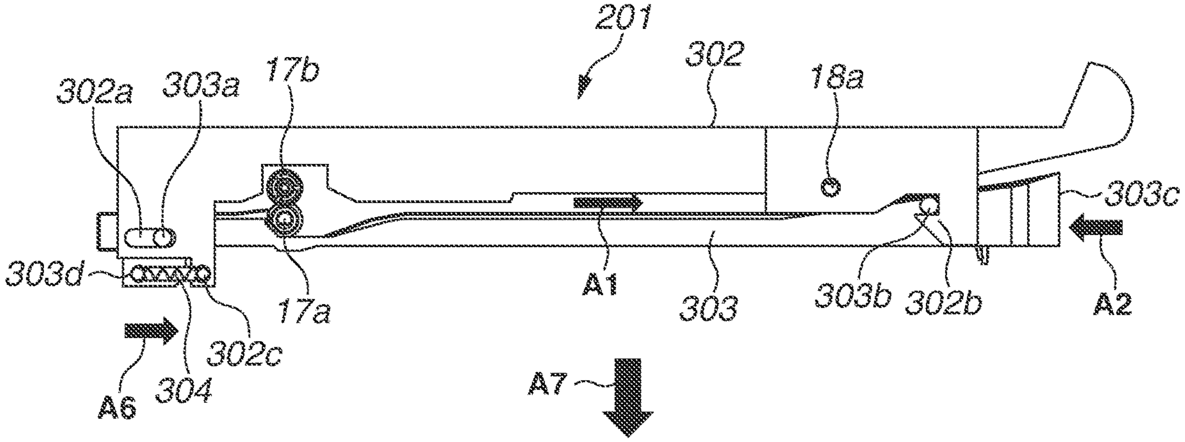
FIG. 17 is a side view of the duplex conveyance unit according to the second exemplary embodiment.

Components and functions similar to those in the first exemplary embodiment will not be described, and features of the present exemplary embodiment will be mainly described. As illustrated in FIG. 17, an image forming apparatus according to the present exemplary embodiment includes a biasing spring 304 as a biasing member that biases a second conveyance guide portion 303 in a direction indicated by an arrow A1.

<Duplex Conveyance Unit>

As illustrated in FIG. 17, an engagement protrusion 303*a* provided on the upstream side of the second conveyance guide portion 303 in the conveyance direction is held in a long hole 302*a* of a first conveyance guide portion 302. Between a spring holding portion 303*d* of the second conveyance guide portion 303 and a frame spring holding portion 302*c* of the first conveyance guide portion 302, the biasing spring 304 is provided as the biasing member that biases the second conveyance guide portion 303 toward the conveyance direction of the sheet S. The direction in which the biasing spring 304 biases the second conveyance guide portion 303 can also be said to be the direction in which a positioning protrusion 303*b* enters a state where the positioning protrusion 303*b* is positioned by a groove 302*b*.

Also in the present exemplary embodiment, when the second conveyance guide portion 303 is moved along the predetermined direction (the opposite direction), the engagement between the groove 302*b* and the positioning protrusion 303*b* is released, and the positioning of the second conveyance guide portion 303 relative to the first conveyance guide portion 302 is released. The direction in which the biasing spring 304 biases the second conveyance guide portion 303 can also be said to be a direction opposite to the predetermined direction.

Figure 18A:
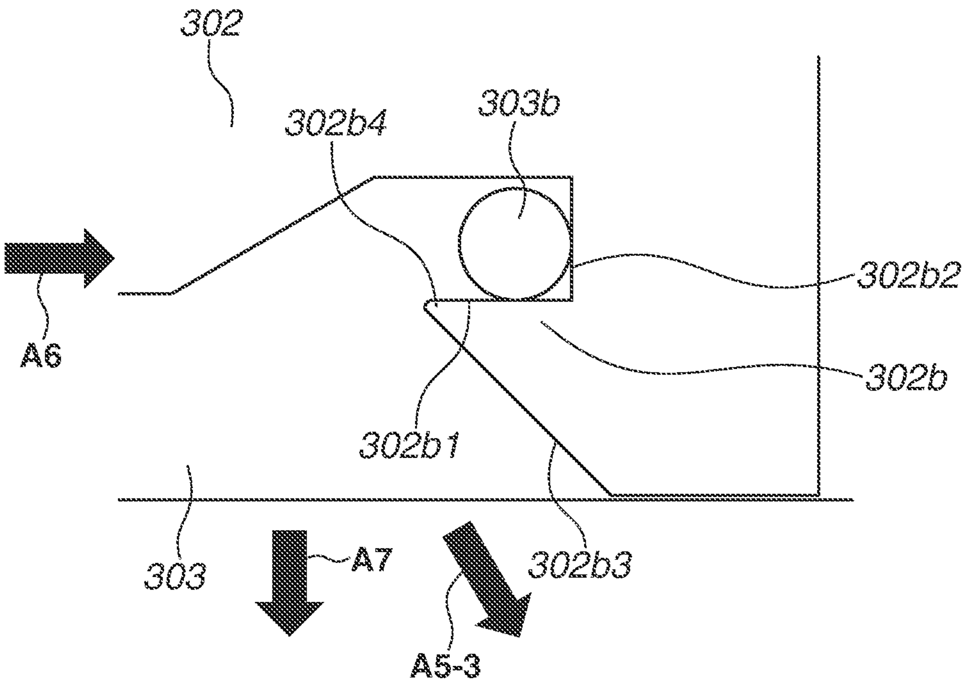
FIGS. 18A and 18B are side views of the duplex conveyance unit according to the second exemplary embodiment.
Figure 18B:
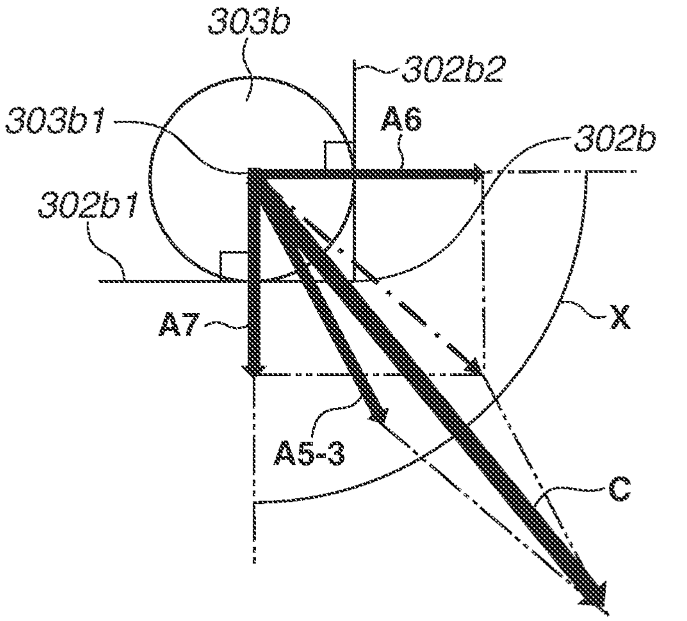

As illustrated in FIG. 18A, three forces, namely, a reaction force, which is indicated by an arrow A5-3, of the sheet re-feeding roller spring 18*c* that applies a pressing force to the second sheet re-feeding roller 18*b* forming a nip portion with the first sheet re-feeding roller 18*a*, a biasing force, which is indicated by an arrow A6, of the biasing spring 304, and gravity, which is indicated by an arrow A7, due to the self-weight of the second conveyance guide portion 303, act on the second conveyance guide portion 303. As illustrated in FIG. 18B, while the positioning protrusion 303*b* is held in the groove 302*b*, an arrow C indicating a direction of a resultant force acting on an axial center 303*b*1 of the positioning protrusion 303*b* overlaps a range X.

As a result, the positioning protrusion 303*b* is securely positioned by the groove 302*b*. In the state where the second conveyance guide portion 303 is positioned relative to the first conveyance guide portion 302 and the positioning protrusion 303*b* is engaged with the groove 302*b*, the positioning protrusion 303*b* are in contact with contact surfaces 302*b*1 and 302*b*2 of the first conveyance guide portion 302. The range X is between a line connecting a point where the positioning protrusion 303*b* and the contact surface 302*b*1 are in contact with each other and the axial center 303*b*1, and a line connecting a point where the positioning protrusion 303*b* and the contact surface 302*b*2 are in contact with each other and the axial center 303*b*1.

In the state where the second conveyance guide portion 303 is positioned relative to the first conveyance guide portion 302, two portions (two contact portions) of the positioning protrusion 303*b* are in contact with a part of the first conveyance guide portion 302 (a part forming the groove 302*b*). The reaction force indicated by the arrow A5-3 acts so that the two contact portions of the positioning protrusion 303*b* are pressed against the part of the first conveyance guide portion 302 (the part forming the groove 302*b*). The resultant force indicated by the arrow C acts so that the two contact portions of the positioning protrusion 303*b* are pressed against the part of the first conveyance guide portion 302 (the part forming the groove 302*b*).

Figure 16:
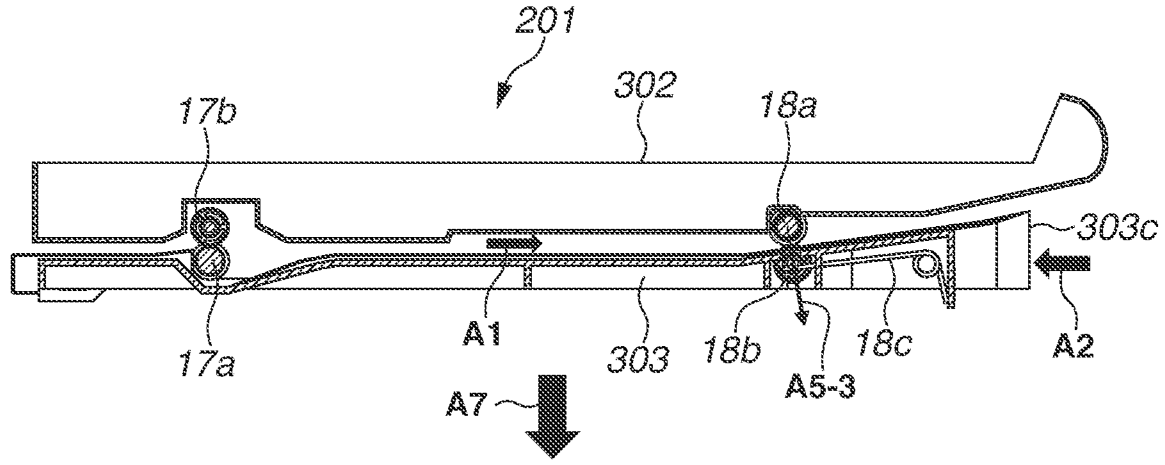
FIG. 16 is a cross-sectional view of a duplex conveyance unit according to a second exemplary embodiment.

The operation of opening the second conveyance guide portion 303 will be described. The second conveyance guide portion 303 includes a handle portion 303*c* configured to push the second conveyance guide portion 303 in the direction indicated by the arrow A2 as illustrated in FIG. 16.

Figure 19A:
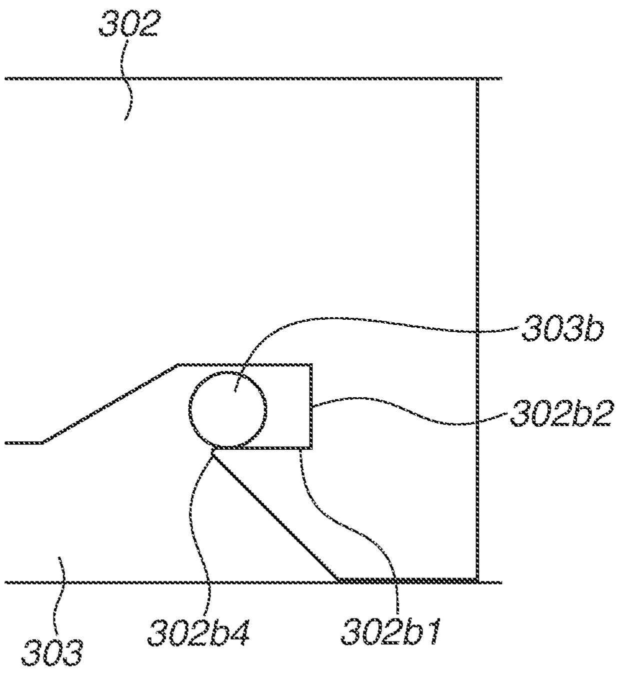
FIGS. 19A and 19B are side views of the duplex conveyance unit according to the second exemplary embodiment.
Figure 19B:
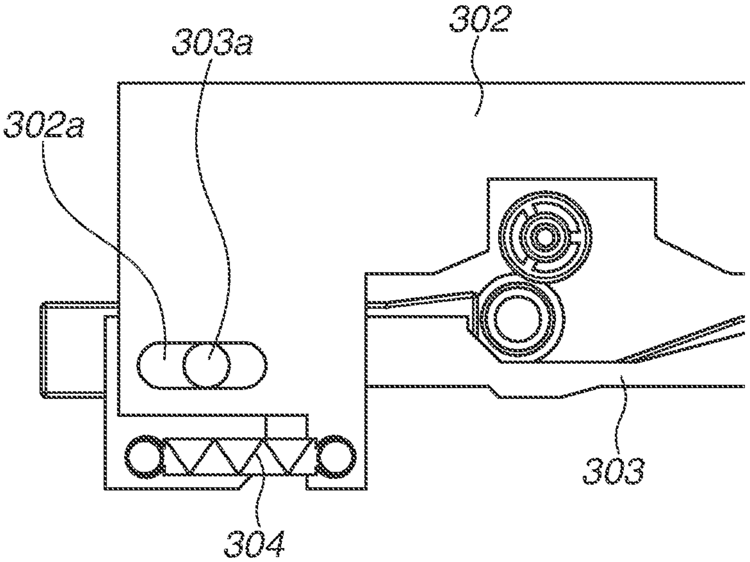

When the second conveyance guide portion 303 is pushed in the direction indicated by the arrow A2, then as illustrated in FIG. 19A, the positioning protrusion 303*b* moves from the contact surface 302*b*2 of the groove 302*b* to the upstream side in the conveyance direction of the sheet S. At this time, as illustrated in FIG. 19B, the engagement protrusion 303*a* moves to the upstream side in the long hole 302*a*. Then, as illustrated in FIG. 20A, the positioning protrusion 303*b* of the second conveyance guide portion 303 passes a first guide portion end 302*b*4.

Figure 20A:
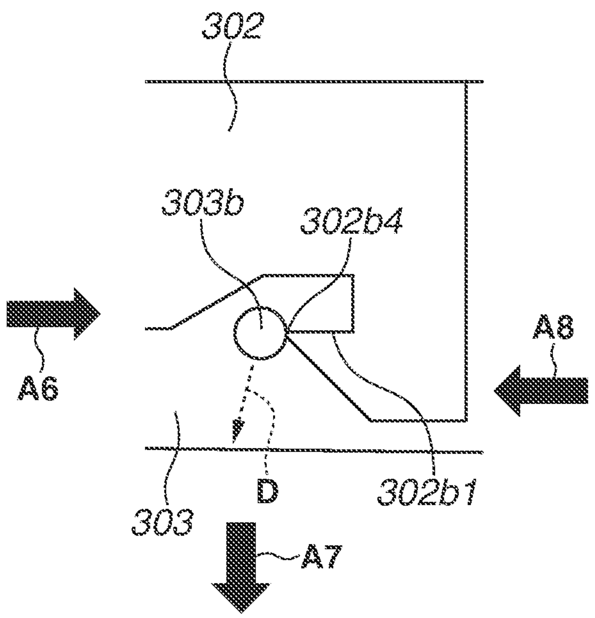
FIGS. 20A to 20C are side views of the duplex conveyance unit according to the second exemplary embodiment.
Figure 20B:
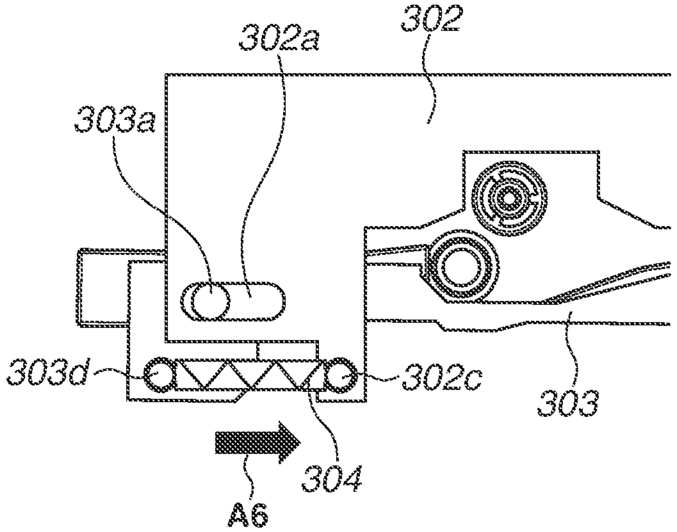
Figure 20C:
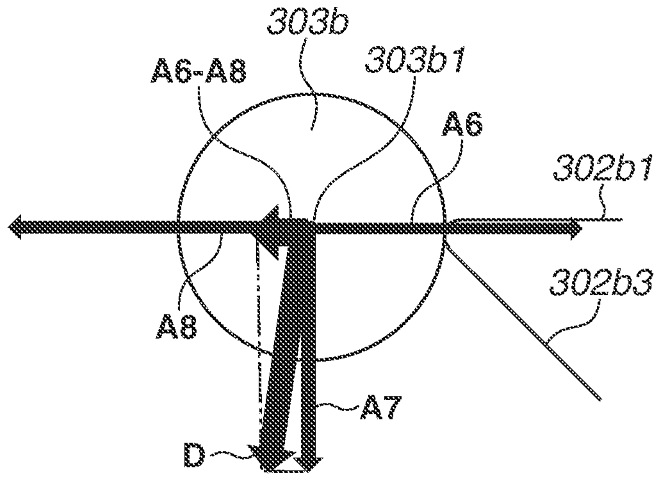
Figure 21:
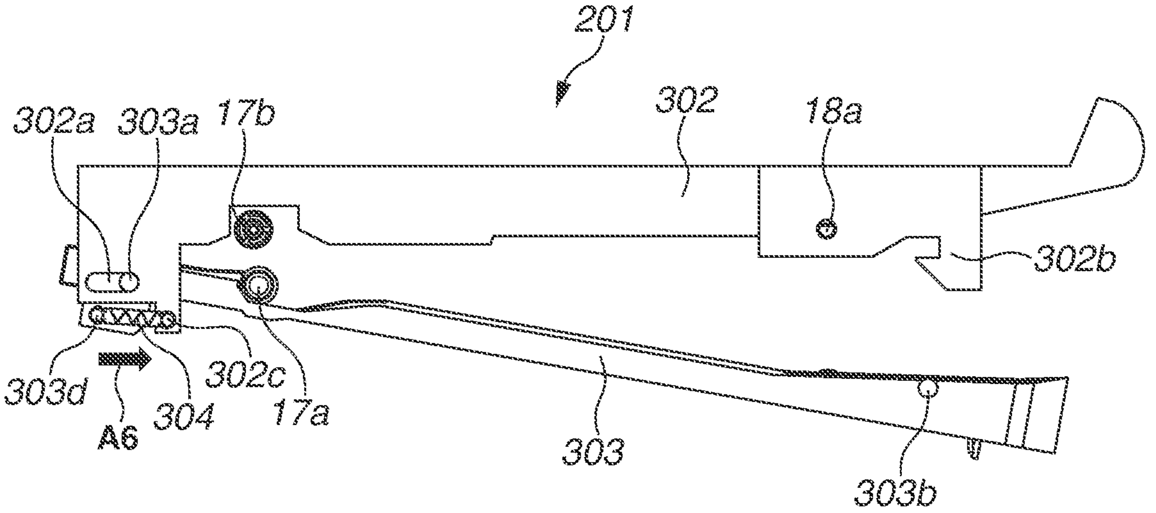
FIG. 21 is a side view of the duplex conveyance unit according to the second exemplary embodiment.

At this time, as illustrated in FIGS. 20A, 20B, and 20C, in addition to an operation force indicated by an arrow A8 and the biasing force indicated by the arrow A6, the self-weight of the second conveyance guide portion 303 indicated by the arrow A7 acts on the second conveyance guide portion 303. With a resultant force of these three forces, which is indicated by a dashed arrow D, the second conveyance guide portion 303 enters an opened state as illustrated in FIG. 21.

Figure 22:
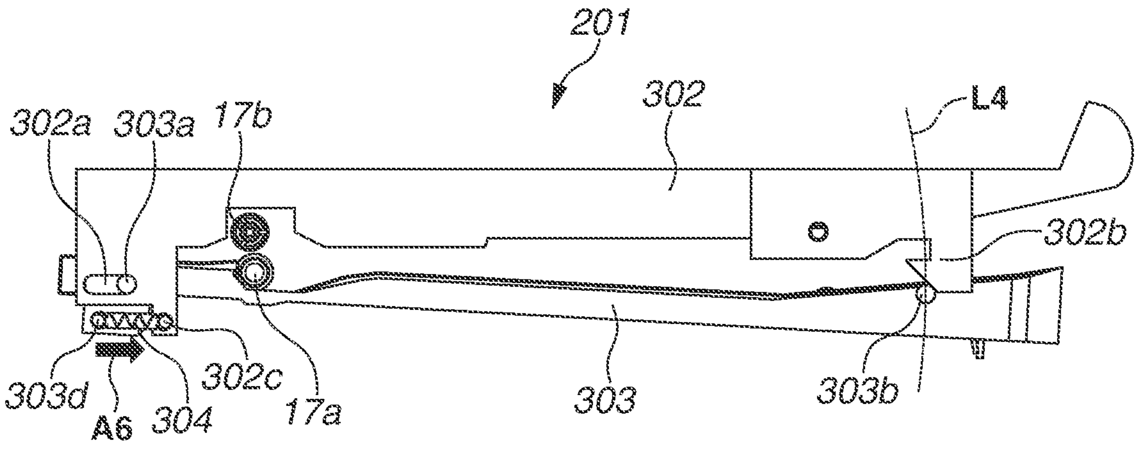
FIG. 22 is a side view of the duplex conveyance unit according to the second exemplary embodiment.

Next, the operation of closing the second conveyance guide portion 303 will be described. When the second conveyance guide portion 303 is lifted up in the opened state illustrated in FIG. 21, then as illustrated in FIG. 22, the engagement protrusion 303*a* can move relative to the long hole 302*a*. FIG. 22 illustrates a pivot trajectory L4 of the positioning protrusion 303*b*. As illustrated in FIG. 22, the second conveyance guide portion 303 is lifted up in a state where the second conveyance guide portion 303 is biased downstream in the conveyance direction by the biasing force, which is indicated by the arrow A6, of the biasing spring 304.

Figure 23A:
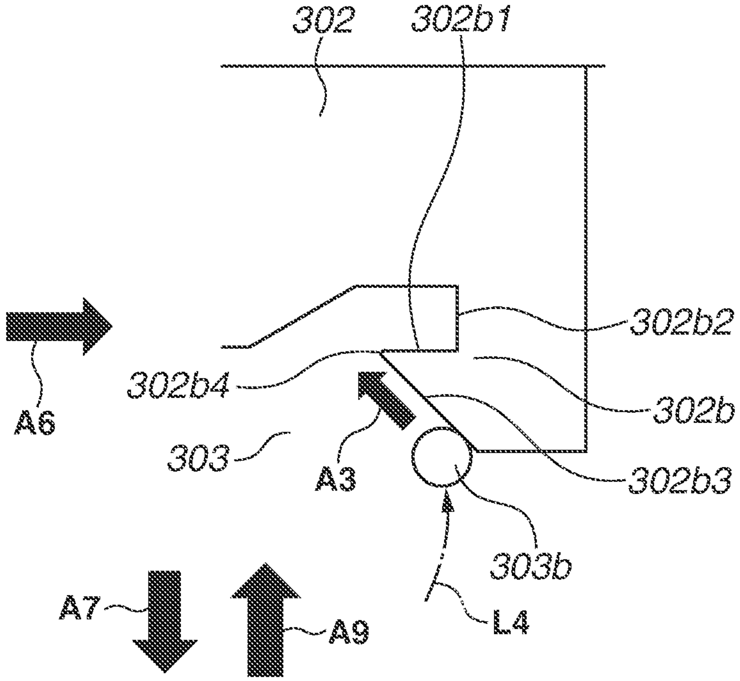
FIGS. 23A and 23B are detailed views of the duplex conveyance unit according to the second exemplary embodiment.
Figure 23B:
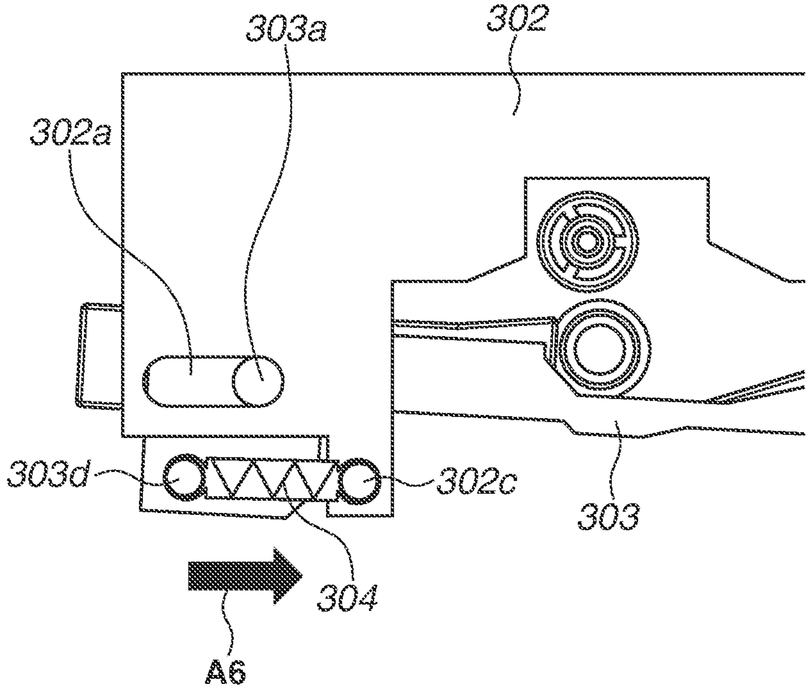

At this time, as illustrated in FIGS. 23A and 23B, in the state where the engagement protrusion 303*a* is engaged with the long hole 302*a*, the positioning protrusion 303*b* comes into contact with a fifth guide portion 302*b*3 of the groove 302*b* on the pivot trajectory L4. Further, as illustrated in FIG. 23A, an operation force for lifting up the second conveyance guide portion 303, which is indicated by an arrow A9, acts on the second conveyance guide portion 303, and the second conveyance guide portion 303 is lifted up against the self-weight indicated by the arrow A7 along the fifth guide portion 302*b*3 in the direction indicated by the arrow A3.

Figure 24A:
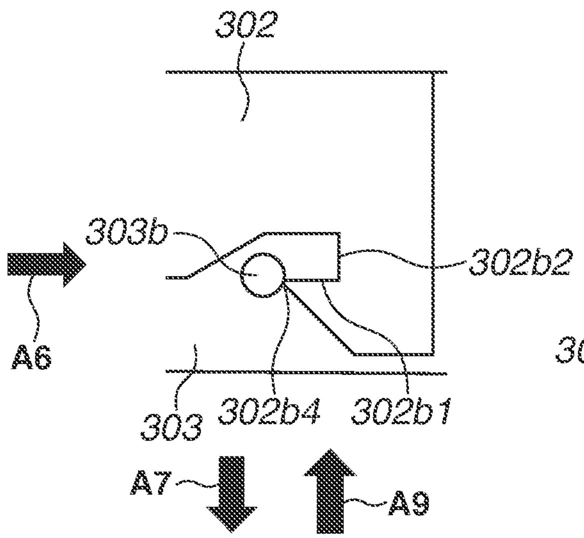
FIGS. 24A to 24D are detailed views of the duplex conveyance unit according to the second exemplary embodiment.
Figure 24B:
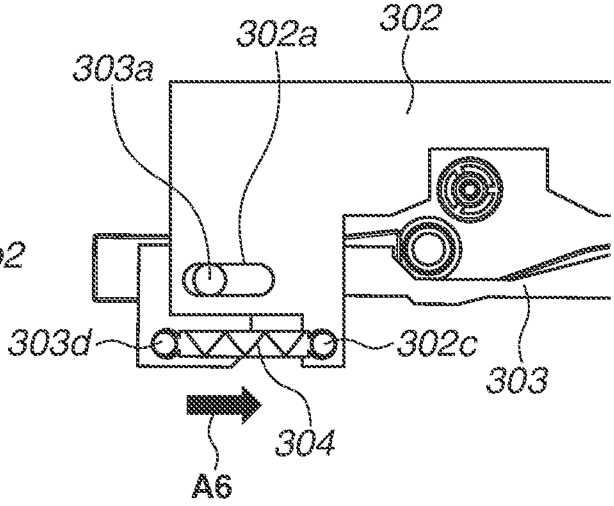
Figure 24C:
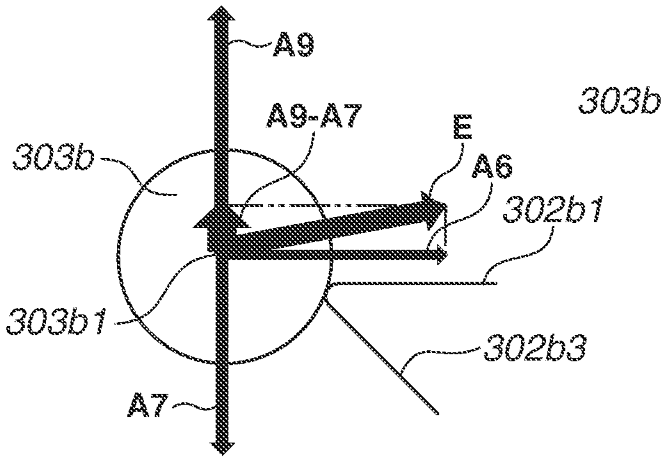

Then, as illustrated in FIGS. 24A and 24B, in the state where the engagement protrusion 303*a* is engaged with the long hole 302*a*, the positioning protrusion 303*b* of the second conveyance guide portion 303 passes the first guide portion end 302*b*4. At this time, in addition to the operation force indicated by the arrow A9 and the self-weight indicated by the arrow A7, the biasing force of the biasing spring 304 indicated by the arrow A6 acts on the second conveyance guide portion 303, and the positioning protrusion 303*b* moves in a direction of a resultant force, indicated by an arrow E in FIG. 24C, by the biasing force indicated by the arrow A6.

Figure 24D:
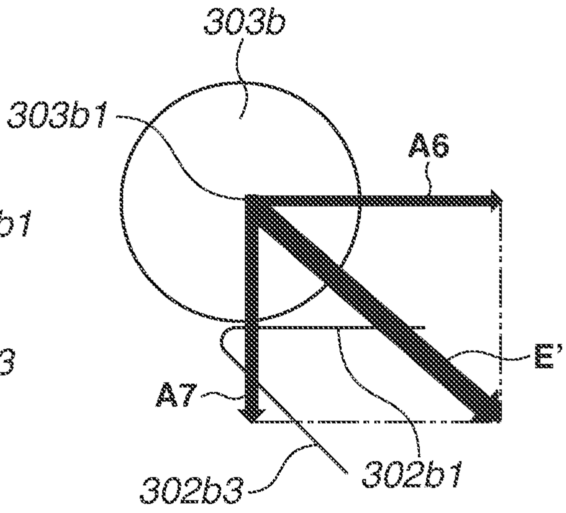

As illustrated in FIG. 24D, the positioning protrusion 303*b* moved in the direction of the resultant force indicated by the arrow E is moved along the contact surface 302*b*1 by a resultant force, indicated by an arrow E', of the biasing force indicated by the arrow A6 and the self-weight indicated by the arrow A7 without the operation force indicated by the arrow A9, and is positioned in the groove 302*b* by the resultant force described above which is indicated by the arrow C.

As described above, in the state where the engagement protrusion 303*a* and the long hole 302*a* are engaged with each other, the second conveyance guide portion 303 is movable to the positioning position and the release position along the predetermined direction relative to the first conveyance guide portion 302.

As illustrated in FIG. 17, while the second conveyance guide portion 303 is at the positioning position relative to the first conveyance guide portion 302, the second conveyance guide portion 303 is positioned relative to the first conveyance guide portion 302. In this state, the groove 302*b* and the positioning protrusion 303*b* are engaged with each other, and the second conveyance guide portion 303 is restricted from pivoting in the opening direction relative to the first conveyance guide portion 302. In other words, with respect to the opening direction about the engagement protrusion 303*a*, a part of the first conveyance guide portion 302 is downstream of a part of the second conveyance guide portion 303.

While the second conveyance guide portion 303 is at the positioning position relative to the first conveyance guide portion 302, the first duplex conveyance roller 17*b* and the second duplex conveyance roller 17*a* are in contact with each other so as to convey the sheet S. Further, the first conveyance guide portion 302 and the second conveyance guide portion 303 form the conveyance path 21.

On the other hand, as illustrated in FIGS. 20A and 20B, while the second conveyance guide portion 303 is at the release position relative to the first conveyance guide portion 302, the engagement protrusion 303*a* and the long hole 302*a* are engaged with each other, and the engagement between the groove 302*b* and the positioning protrusion 303*b* is released. In this state, the second conveyance guide portion 303 is allowed to pivot in the opening direction relative to the first conveyance guide portion 302. In the state where the engagement protrusion 303*a* and the long hole 302*a* are engaged with each other, the second conveyance guide portion 303 pivots from the release position in the opening direction relative to the first conveyance guide portion 302, whereby the conveyance path 21 is opened.

In the state where the engagement protrusion 303*a* and the long hole 302*a* are engaged with each other, when the second conveyance guide portion 303 is moved along the predetermined direction relative to the first conveyance guide portion 302, the engagement between the groove 302*b* and the positioning protrusion 303*b* is released. Then, the positioning of the second conveyance guide portion 303 relative to the first conveyance guide portion 302 is also released. The predetermined direction can be referred to as "a direction from the positioning position to the release position". When the second conveyance guide portion 303 is moved from the positioning position to the release position, the second duplex conveyance roller 17*a* moves relative to the first duplex conveyance roller 17*b*. More specifically, the second duplex conveyance roller 17*a* moves in a direction intersecting the rotational axis direction of the first duplex conveyance roller 17*b*. While the second conveyance guide portion 303 is at the release position, the second duplex conveyance roller 17*a* is away from the first duplex conveyance roller 17*b*.

Further, the biasing spring 304 biases the second conveyance guide portion 303 in a direction from the release position to the positioning position.

As described above, the biasing spring 304 applies the biasing force indicated by the arrow A6 in a direction against the pressing direction, whereby it is possible to hold the positioning protrusion 303*b* in the groove 302*b* without the operation force, indicated by the arrow A9, after the positioning protrusion 303*b* passes the first guide portion end 302*b*4. The present exemplary embodiment makes it possible to provide an image forming apparatus including a conveyance guide portion that simplifies the operation of the user and is excellent in usability.

Figure 25A:
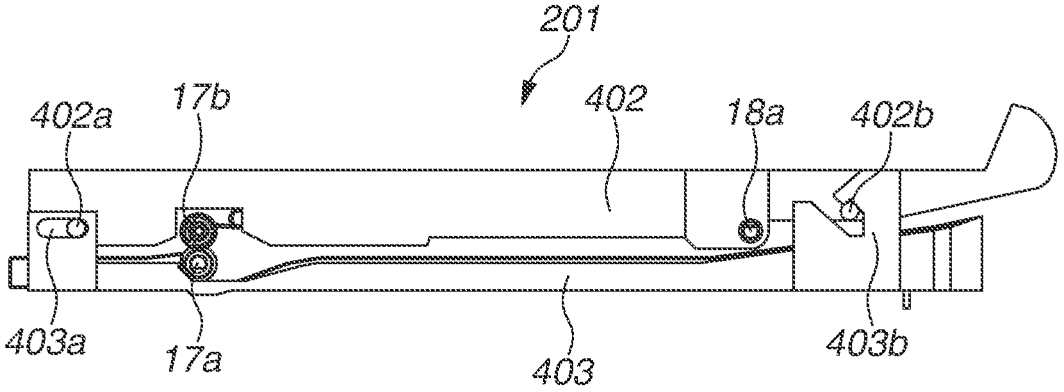
FIGS. 25A and 25B are side views of a duplex conveyance unit according to a third exemplary embodiment.
Figure 25B:
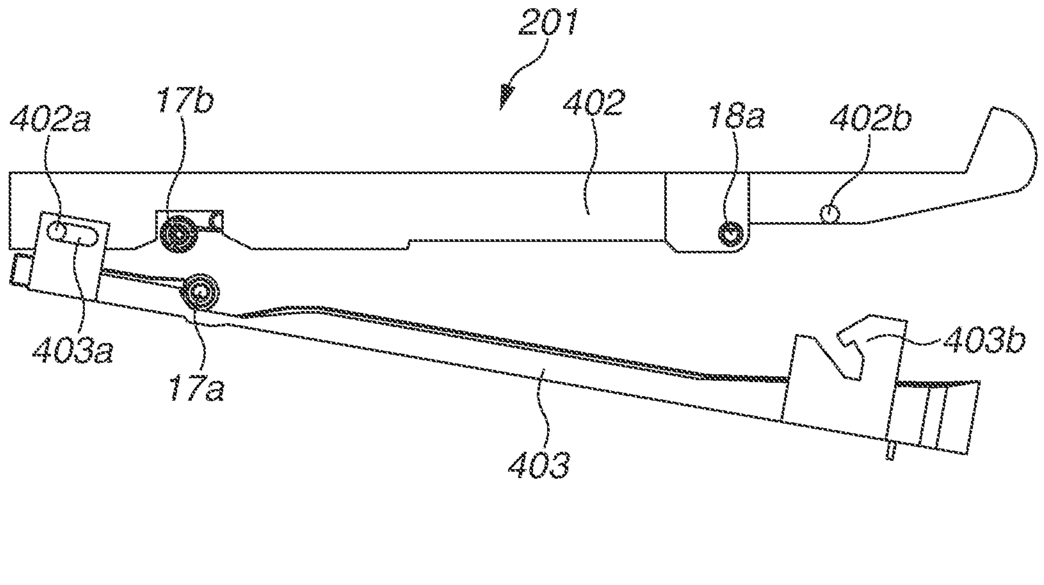

FIGS. 25A and 25B are side views illustrating a configuration according to a third exemplary embodiment. FIG. 25A illustrates a state where a second conveyance guide portion 403 is closed. FIG. 25B illustrates a state where the second conveyance guide portion 403 is opened. As illustrated in FIGS. 25A and 25B, the second conveyance guide portion 403 includes a long hole 403*a* as a first engaged portion, and a groove 403*b* as a second engaged portion. A first conveyance guide portion 402 includes an engagement protrusion 402*a* as a first engagement portion, and a positioning protrusion 402*b* as a second engagement portion.

Alternatively, the first engagement portion can be a first protruding portion, the first engaged portion can be a long hole with which the first protruding portion is engaged, the second engaged portion can be a second protruding portion, and the second engagement portion can be a groove portion with which the second protruding portion is engaged. Yet alternatively, the first engaged portion can be a first protruding portion, the first engagement portion can be a long hole with which the first protruding portion is engaged, the second engagement portion can be a second protruding portion, and the second engaged portion can be a groove portion with which the second protruding portion is engaged. The groove portion can have a semicircular shape instead of a V-shape. The long hole can have a groove shape.

In other words, one of the first engagement portion and the first engaged portion can be a protruding portion, and the other can be a long hole with which the protruding portion is engaged. One of the second engagement portion and the second engaged portion can be a protruding portion, and the other can be a groove portion with which the protruding portion is engaged. The same applies to the configuration according to the second exemplary embodiment.

A fourth exemplary embodiment will be described with reference to FIGS. 26 to 32B. In the present exemplary embodiment, components similar to those described in the first exemplary embodiment are designated by the same reference numerals. Components and functions similar to those in the first exemplary embodiment will not be described, and features of the present exemplary embodiment will be mainly described.

Figure 26:
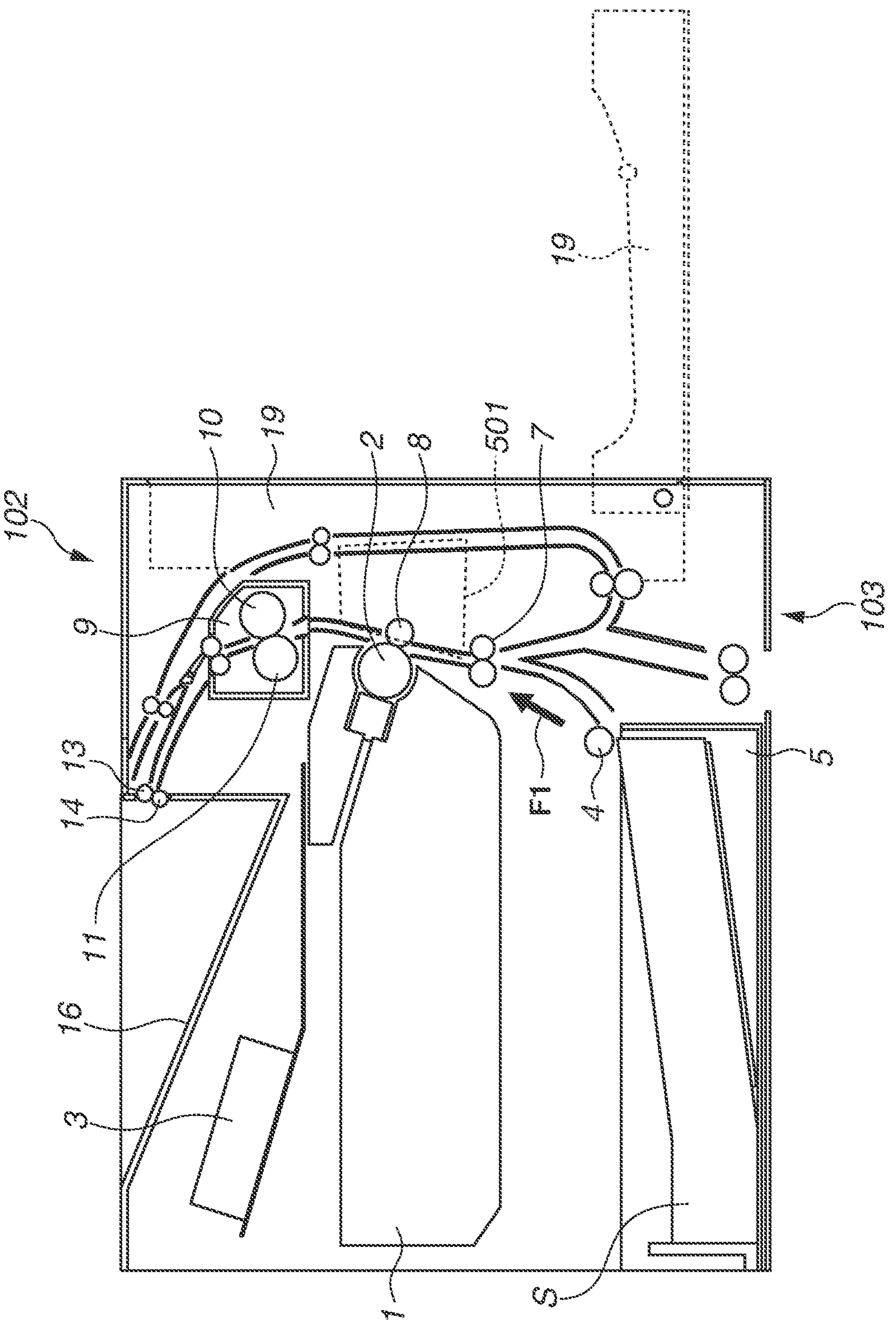
FIG. 26 is a cross-sectional view of an image forming apparatus according to a fourth exemplary embodiment.

FIG. 26 is a cross-sectional view of an image forming apparatus 102 according to the present exemplary embodiment. FIG. 26 illustrates a configuration for opening a transfer unit 501. Also in a case where a conveyance path in which the sheet S is conveyed again extends in an up-down direction as illustrated in FIG. 26, it is possible to open the conveyance path as illustrated in the first to third exemplary embodiments. More specifically, it is possible to release the positioning of a conveyance guide by moving the conveyance guide in the up-down direction, and open the conveyance path by pivoting the conveyance guide. As a method for engaging the conveyance guide, a method similar to those illustrated in the first to third exemplary embodiments can be used.

In the present exemplary embodiment, the image forming apparatus 102 is different from the image forming apparatus 101 according to the first exemplary embodiment in the conveyance path of the sheet S. The image forming apparatus 102 according to the present exemplary embodiment includes the photosensitive drum 2 as a first roller, and the transfer roller 8 capable of coming into contact with the photosensitive drum 2 as a second roller. The sheet S fed from the sheet feeding cassette 5 by the sheet feeding roller 4 passes through the registration roller pair 7, the transfer unit 501, and the fixing device 9 above the sheet S in the vertical direction, and is discharged to the sheet discharge tray 16 by the sheet discharge roller 13 and the sheet discharge driven roller 14. In such a case, to clear a jam or replace the transfer roller 8, the transfer unit 501 is opened and closed.

<Transfer Unit>

Figure 27:
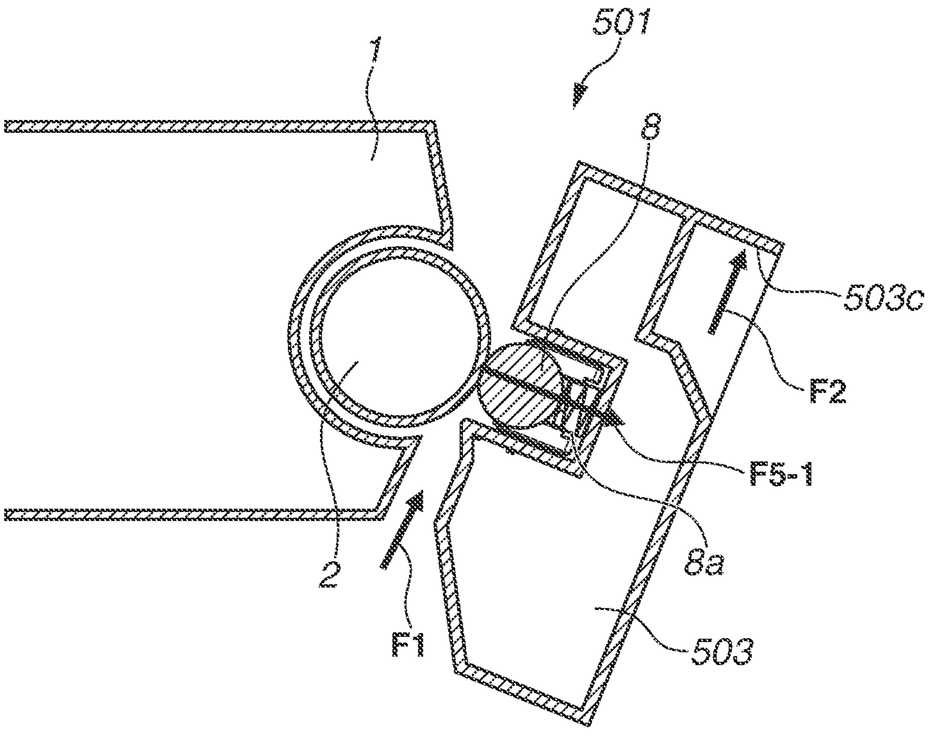
FIG. 27 is a cross-sectional view of a transfer unit according to the fourth exemplary embodiment.
Figure 28:
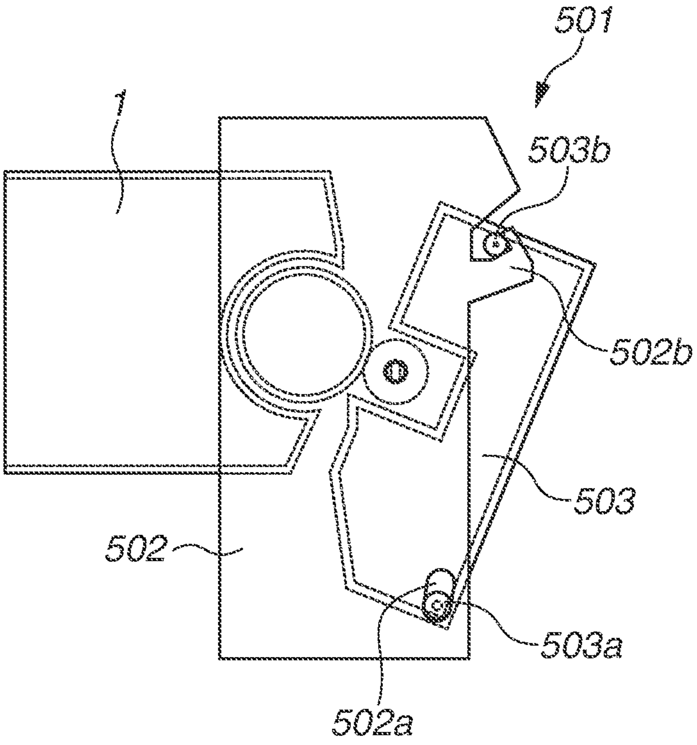
FIG. 28 is a side view of the transfer unit according to the fourth exemplary embodiment.

A configuration of the transfer unit 501 in FIG. 26 will be described with reference to FIGS. 27 and 28. FIG. 27 is a schematic cross-sectional view of the transfer unit 501. FIG. 28 is a schematic side view illustrating a mechanism for fixing a second conveyance guide portion 503, which is provided at each end of the conveyance path in the second conveyance guide portion 503. An arrow F1 in FIG. 27 indicates the conveyance direction of the sheet S.

As illustrated in FIG. 28, an engagement protrusion 503*a* provided on the upstream side of the second conveyance guide portion 503 in the conveyance direction is held in a long hole 502*a* of a first conveyance guide portion 502, and a positioning protrusion 503*b* provided on the downstream side is held in a groove 502*b*. In this state, as illustrated in FIG. 27, the positioning protrusion 503*b* is positioned in the groove 502*b* by the reaction force of a transfer roller spring 8*a* that applies a pressing force to the transfer roller 8 forming a nip portion with the photosensitive drum 2.

In the image forming apparatus 102 according to the present exemplary embodiment, a main body 103 excluding the second conveyance guide portion 503 capable of opening and closing includes the first conveyance guide portion 502 and the photosensitive drum 2 which is the first roller. The first conveyance guide portion 502 is provided in a frame of the main body 103, and the groove 502*b* and the long hole 502*a* are provided in the first conveyance guide portion 502. In other words, the main body 103 includes the first conveyance guide portion 502.

Figure 29:
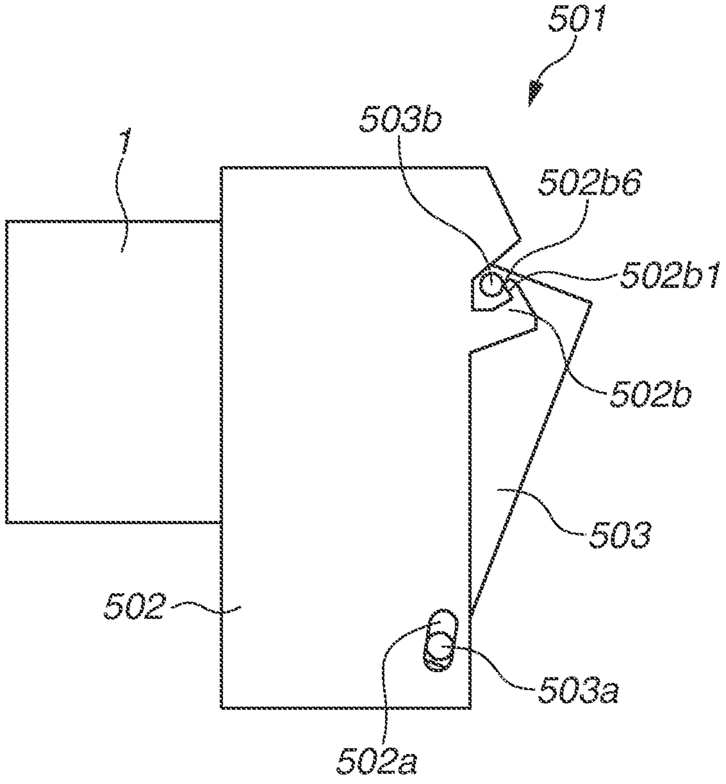
FIG. 29 is a side view of the transfer unit according to the fourth exemplary embodiment.
Figure 30:
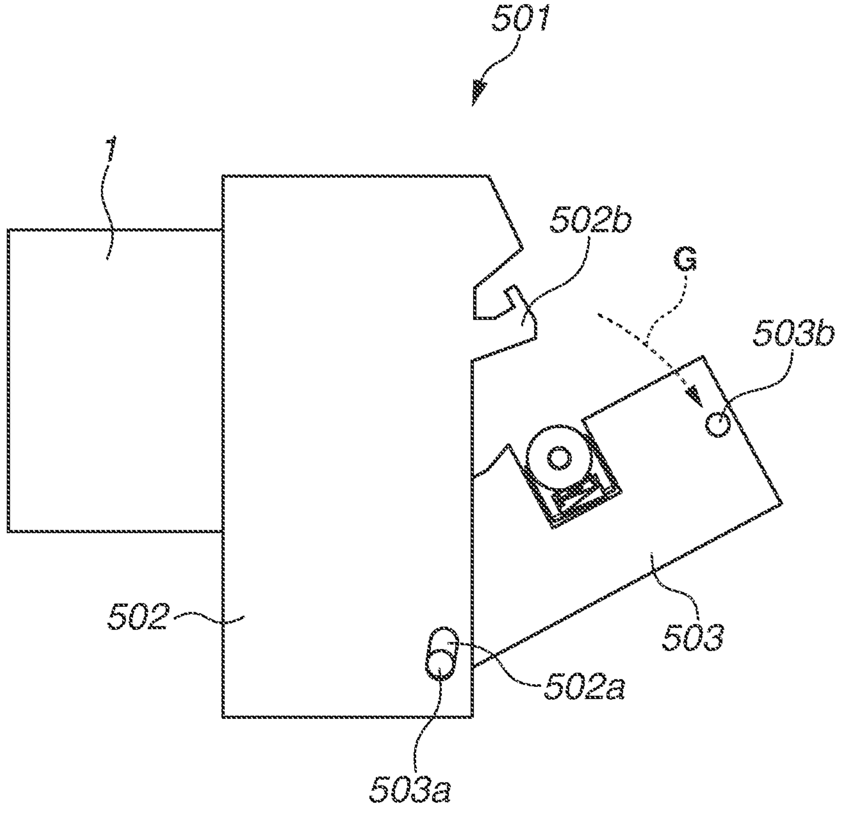
FIG. 30 is a side view of the transfer unit according to the fourth exemplary embodiment.

The operation of opening the second conveyance guide portion 503 will now be described. To open the second conveyance guide portion 503, a door 19 illustrated in FIG. 26 is opened (brought into a state indicated by a dashed line), and a force is applied to a handle portion 503*c* of the second conveyance guide portion 503 illustrated in FIG. 27 in a direction indicated by an arrow F2. Then, as illustrated in FIG. 29, the positioning protrusion 503*b* climbs up a first guide portion 502*b*1 of the groove 502*b* and climbs over a first guide portion end 502*b*6. Then, as illustrated in FIG. 30, the positioning protrusion 503*b* moves in a direction indicated by a dashed arrow G, and the second conveyance guide portion 503 enters an opened state.

Figure 31A:
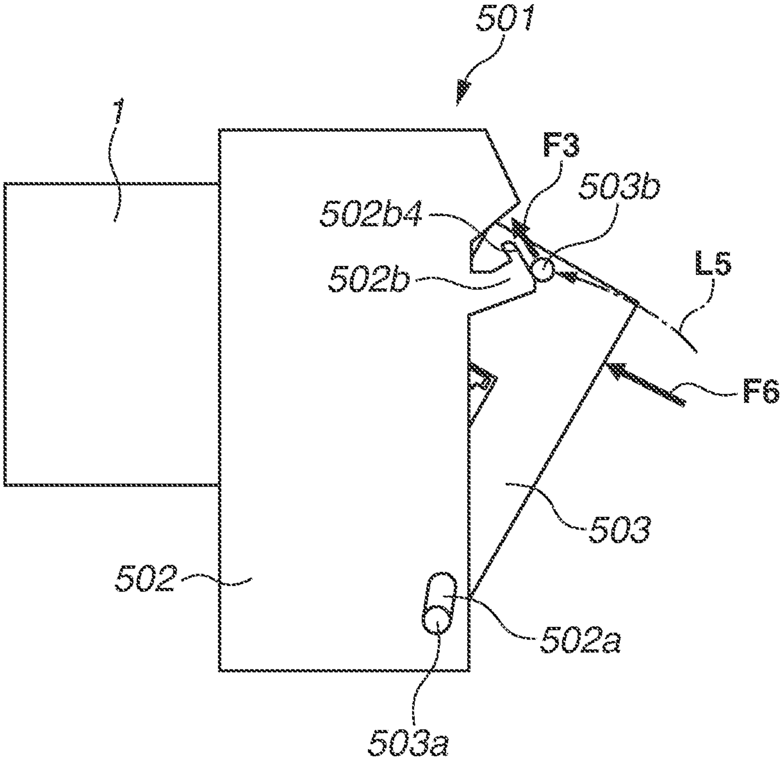
FIGS. 31A and 31B are side views of the transfer unit according to the fourth exemplary embodiment.

Next, the operation of closing the second conveyance guide portion 503 will be described with reference to FIGS. 31A and 31B. When the second conveyance guide portion 503 is lifted up in the opened state, the engagement protrusion 503*a* can move relative to the long hole 502*a* along the conveyance direction of the sheet S. As illustrated in FIG. 31A, when the second conveyance guide portion 503 is closed in a state where the engagement protrusion 503*a* is at a lower end of the long hole 502*a*, the positioning protrusion 503*b* comes into contact with a fourth guide portion 502*b*4 on a pivot trajectory L5.

In this state, when the user presses the second conveyance guide portion 503 in a direction (indicated by an arrow F6) in which the second conveyance guide portion 503 is closed, the positioning protrusion 503*b* moves along the fourth guide portion 502*b*4 in a direction indicated by an arrow F3, and comes into contact with a third guide portion 502*b*3.

Figure 31B:
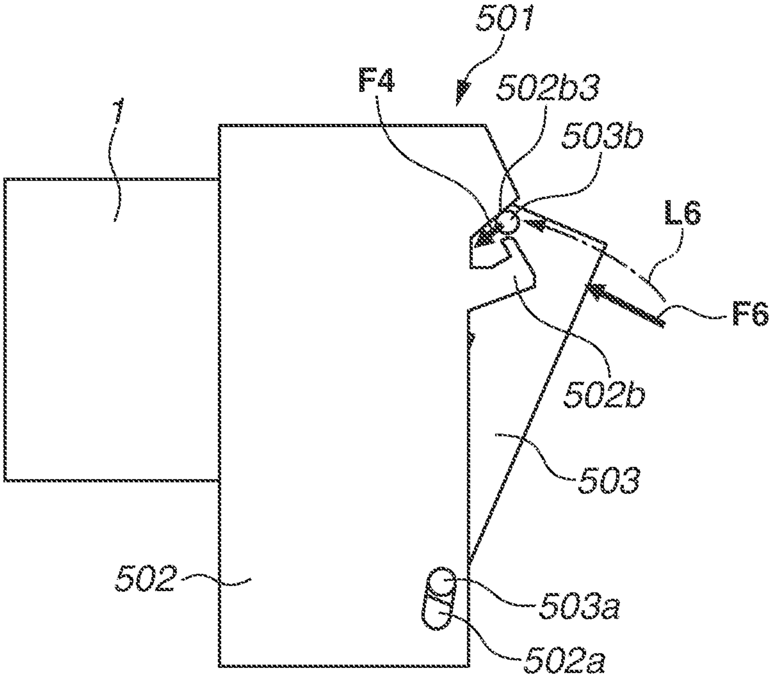

As illustrated in FIG. 31B, when the second conveyance guide portion 503 is closed in a state where the engagement protrusion 503*a* is at an upper end of the long hole 502*a*, the positioning protrusion 503*b* comes into contact with the third guide portion 502*b*3 on a pivot trajectory L6. In this state, when the user presses the second conveyance guide portion 503 in the direction (indicated by the arrow F6) in which the second conveyance guide portion 503 is closed, the positioning protrusion 503*b* moves along the third guide portion 502*b*3 in a direction indicated by an arrow F4. Then, as illustrated in FIG. 32A, the positioning protrusion 503*b* reaches a contact surface 502*b*5 of the groove 502*b*.

Figure 32A:
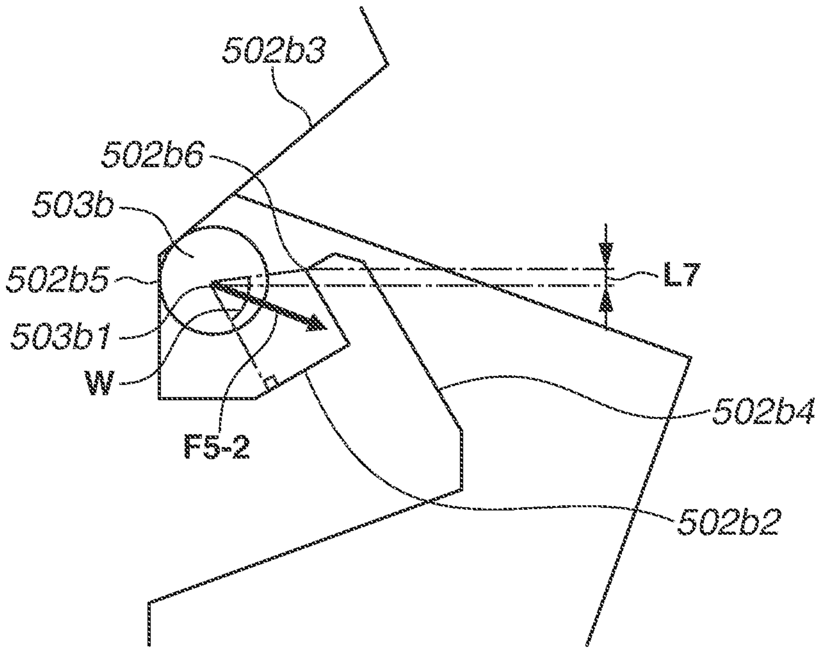
FIGS. 32A and 32B are side views of the transfer unit according to the fourth exemplary embodiment.
Figure 32B:
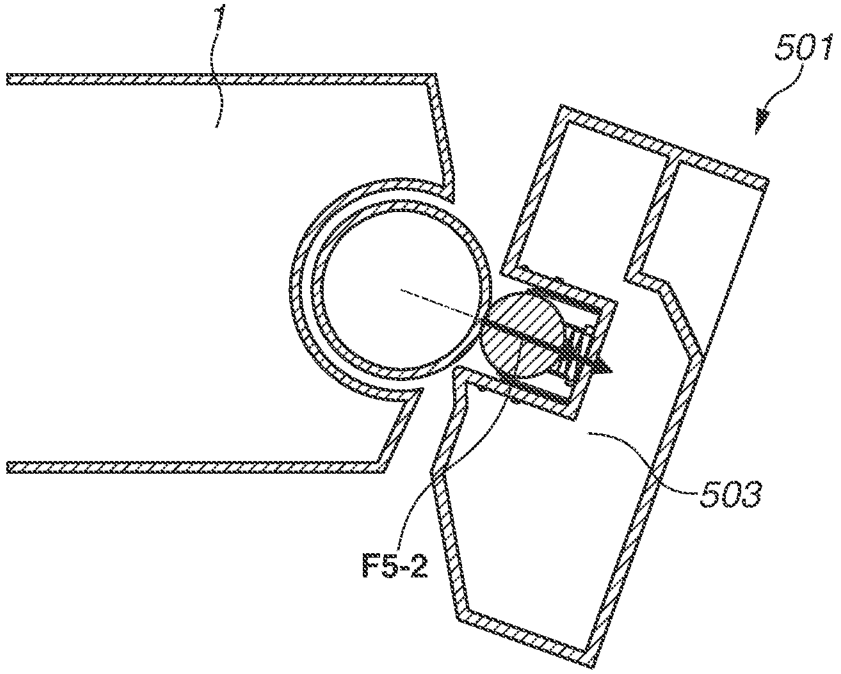

In the present exemplary embodiment, as illustrated in FIG. 32A, an axial center 503*b*1 of the positioning protrusion 503*b* is configured to be upstream of the first guide portion end 502*b*6 in the conveyance direction by a distance L7. When the user releases the second conveyance guide portion 503 in this state, the positioning protrusion 503*b* is positioned in the groove 502*b*.

As illustrated in FIG. 32A, when the positioning protrusion 503*b* comes into contact with the contact surface 502*b*5 of the groove 502*b*, an arrow F5-2 indicating the direction of the reaction force of the transfer roller 8 acting on the axial center 503*b*1 of the positioning protrusion 503*b* overlaps a range W. The range W is from a line connecting the axial center 503*b*1 of the positioning protrusion 503*b* and the first guide portion end 502*b*6 to a perpendicular to a second guide portion 502*b*2 passing through the axial center 503*b*1 of the positioning protrusion 503*b*.

The configuration according to the present exemplary embodiment makes it possible to directly position the second conveyance guide portion 503 relative to the main body 103. The configuration makes it also possible to provide an image forming apparatus including a conveyance guide portion that can be inexpensively miniaturized and is excellent in usability and attachment position accuracy.

According to the exemplary embodiments of the present disclosure, it is possible to release the positioning of a conveyance guide portion by moving the conveyance guide portion itself. It is therefore possible to provide an image forming apparatus excellent in usability.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-063812, filed Apr. 7, 2022, and Japanese Patent Application No. 2023-012441, filed Jan. 31, 2023, which are hereby incorporated by reference herein in its entirety.

What is claimed is:

1. An image forming apparatus configured to form an image on a sheet, the image forming apparatus comprising:

a first conveyance guide portion including a first roller, a first engagement portion, and a second engagement portion; and a second conveyance guide portion including a second roller, a first engaged portion configured to be engaged with the first engagement portion, and a second engaged portion configured to be engaged with the second engagement portion, wherein the second conveyance guide portion includes a pressed portion, and pressing the pressed portion causes (i) the second conveyance guide portion to move in a direction in which the engagement between the second engagement portion and the second engaged portion is released, (ii) the second roller to move relative to the first roller, and (iii) the engagement between the second engagement portion and the second engaged portion to be released, wherein, in a state where the second conveyance guide portion is positioned at a predetermined position relative to the first conveyance guide portion, the first conveyance guide portion and the second conveyance guide portion form a conveyance path in which the sheet is conveyed, and the first roller and the second roller are in contact with each other so as to convey the sheet, wherein, in a state where the first engagement portion and the first engaged portion are engaged with each other, the second conveyance guide portion is configured to move along a predetermined direction relative to the first conveyance guide portion so that the engagement between the second engagement portion and the second engaged portion is released and the positioning of the second conveyance guide portion relative to the first conveyance guide portion is released, and wherein, in a state where the first engagement portion and the first engaged portion are engaged with each other and the positioning of the second conveyance guide portion relative to the first conveyance guide portion is released, the second conveyance guide portion is configured to pivot in an opening direction relative to the first conveyance guide portion so that the conveyance path is opened.

2. The image forming apparatus according to claim 1, wherein, in the state where the first engagement portion and the first engaged portion are engaged with each other, the second conveyance guide portion is configured to move between a positioning position and a release position relative to the first conveyance guide portion, wherein, while the second conveyance guide portion is at the positioning position, the second conveyance guide portion is positioned relative to the first conveyance guide portion and is restricted from pivoting in the opening direction relative to the first conveyance guide portion, and wherein, while the second conveyance guide portion is at the release position, the second conveyance guide portion is allowed to pivot in the opening direction relative to the first conveyance guide portion.

3. The image forming apparatus according to claim 2, wherein, in a case where the second conveyance guide portion moves from the positioning position to the release position, the second roller moves relative to the first roller.

4. The image forming apparatus according to claim 2, further comprising a biasing member configured to bias the second conveyance guide portion in a direction from the release position to the positioning position.

5. The image forming apparatus according to claim 1, wherein the second engagement portion is configured to receive a self-weight of the second conveyance guide portion via the second engaged portion.

6. The image forming apparatus according to claim 1, further comprising a biasing member configured to bias the second conveyance guide portion in a direction in which the second engaged portion enters a state of being positioned by the second engagement portion.

7. The image forming apparatus according to claim 1, wherein the first engaged portion is a protruding portion, and the first engagement portion is a long hole with which the protruding portion is engaged.

8. The image forming apparatus according to claim 1, wherein the first engaged portion is a long hole, and the first engagement portion is a protruding portion configured to be engaged with the long hole.

9. The image forming apparatus according to claim 1, wherein the second engaged portion or the second engagement portion is a protruding portion.

10. The image forming apparatus according to claim 1, wherein the first conveyance guide portion includes a third roller configured to convey the sheet, and the second conveyance guide portion includes a fourth roller configured to come into contact with the third roller and convey the sheet, and wherein a roller biasing portion is configured to bias the fourth roller toward the third roller.

11. The image forming apparatus according to claim 1, wherein the conveyance path is a conveyance path in which the sheet with the image formed on one side of the sheet is conveyed.

12. The image forming apparatus according to claim 1, wherein the second conveyance guide portion pivots in the opening direction under a self-weight of the second conveyance guide portion relative to the first conveyance guide portion.

13. The image forming apparatus according to claim 1, wherein, in a state where the second conveyance guide portion pivots and the conveyance path is opened, the first roller and the second roller are away from each other.

14. The image forming apparatus according to claim 1, wherein moving the second conveyance guide portion along the predetermined direction causes the first roller and the second roller to separate from each other.

15. The image forming apparatus according to claim 1, further comprising a main body including the first conveyance guide portion, wherein the first roller is a photosensitive drum, and the second roller is a transfer roller configured to come into contact with the photosensitive drum.

16. The image forming apparatus according to claim 1, wherein the predetermined direction is a direction opposite to a conveyance direction of the sheet.

17. The image forming apparatus according to claim 1, wherein the pressing the pressed portion causes the second conveyance guide portion to move in the direction in which the engagement between the second engagement portion and the second engaged portion is released and causes the first engaged portion to move relative to the first engaging portion.

18. The image forming apparatus according to claim 10, wherein, in a state where the conveyance path is opened, a distance between the third roller and the fourth roller is longer than a distance between the first roller and the second roller.

* * * * *